(12) United States Patent
Sasabe et al.

(10) Patent No.: US 7,775,028 B2
(45) Date of Patent: Aug. 17, 2010

(54) ANNULAR METAL CORD AND ENDLESS METAL BELT

(75) Inventors: Hiroshi Sasabe, Tochigi (JP); Hitoshi Wakahara, Tochigi (JP); Yuichi Sano, Tochigi (JP); Kenichi Okamoto, Hyogo (JP); Koji Kato, Aichi (JP); Masaki Saito, Aichi (JP)

(73) Assignees: Sumitomo (SEI) Steel Wire Corp., Hyogo (JP); Sumitomo Electric Tochigi Co., Ltd., Tochigi (JP)

( * ) Notice: Subject to any disclaimer, the term of this patent is extended or adjusted under 35 U.S.C. 154(b) by 32 days.

(21) Appl. No.: 11/989,711

(22) PCT Filed: Nov. 9, 2006

(86) PCT No.: PCT/JP2006/322391

§ 371 (c)(1),
(2), (4) Date: Jan. 30, 2008

(87) PCT Pub. No.: WO2007/055290

PCT Pub. Date: May 18, 2007

(65) Prior Publication Data

US 2009/0087678 A1    Apr. 2, 2009

(30) Foreign Application Priority Data

Nov. 10, 2005   (JP)   ............... 2005-326286
Nov. 8, 2006    (JP)   ............... 2006-302616

(51) Int. Cl.
    *F16G 9/00*   (2006.01)
(52) U.S. Cl. ..................................... 57/201
(58) Field of Classification Search ............ 57/21, 57/201
    See application file for complete search history.

(56) References Cited

U.S. PATENT DOCUMENTS 1,429,123 A * 9/1922 Beyea ..................... 245/1.5

(Continued)

FOREIGN PATENT DOCUMENTS

JP          1-272833         10/1989

(Continued)

OTHER PUBLICATIONS

International Preliminary Report on Patentability and Written Opinion of The International Searching Authority issued in International Application No. PCT/JP2006/322391, dated May 22, 2008.

(Continued)

*Primary Examiner*—Shaun R Hurley
(74) *Attorney, Agent, or Firm*—McDermott Will & Emery LLP

(57) ABSTRACT

An annular metal cord includes an annular core portion and an outer layer portion. The annular core portion is formed by connecting together both ends of a first strand material which is made up of six twisted first metal filaments. The outer layer portion is formed by winding spirally a second strand material which is made up of six twisted second metal filaments around the annular core portion. The second strand material is wound at a predetermined winding angle relative to a center axis of the annular core portion, and a winding initiating end portion and a winding terminating end portion are connected together. As a result, the breaking strength of the annular metal cord can be made large, and the production thereof can be facilitated.

14 Claims, 15 Drawing Sheets

U.S. PATENT DOCUMENTS

Figure 1:
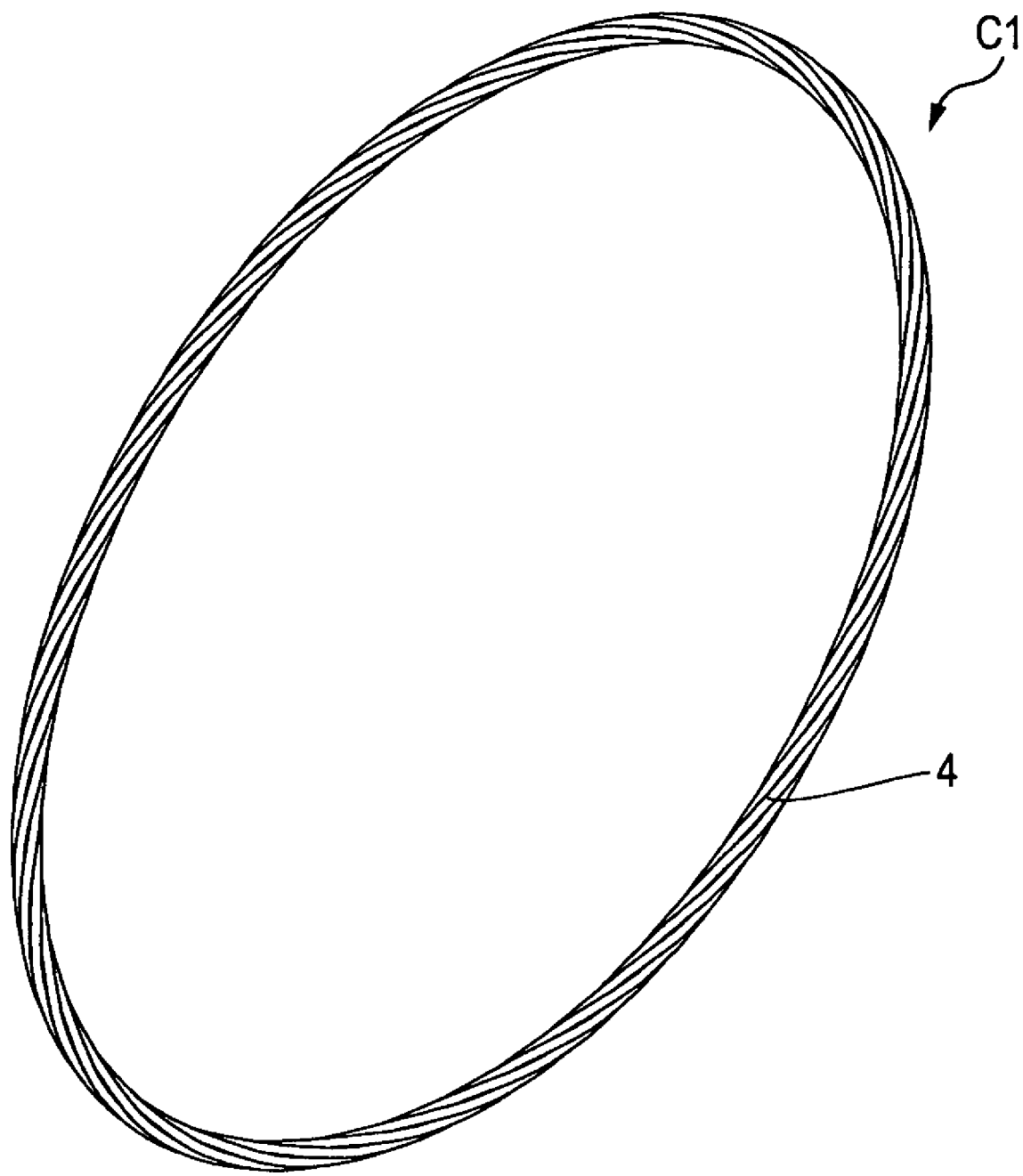

| | | | | |
|---|---|---|---|---|
| 1,429,124 A | * | 9/1922 | Beyea | 245/1.5 |
| 2,216,922 A | * | 10/1940 | Naysmith et al. | 57/21 |
| 2,444,583 A | * | 7/1948 | Stewart et al. | 474/262 |
| 3,026,762 A | * | 3/1962 | Jordan | 87/8 |
| 3,631,733 A | * | 1/1972 | Thompson, Jr. | 474/255 |
| 3,934,397 A | | 1/1976 | Black | |
| 6,260,343 B1 | * | 7/2001 | Pourladian | 57/200 |
| 6,381,939 B1 | | 5/2002 | Brown et al. | |
| 2008/0277040 A1 | * | 11/2008 | Okamoto et al. | 152/539 |
| 2009/0136697 A1 | * | 5/2009 | Sano et al. | 428/36.3 |

FOREIGN PATENT DOCUMENTS

| | | |
|---|---|---|
| JP | 4-307146 | 10/1992 |
| JP | 06-158567 | 6/1994 |
| JP | 9-273088 | 10/1997 |
| JP | 2003-236610 | 8/2003 |
| JP | 2005-238997 | 9/2005 |
| JP | 2005-280606 | 10/2005 |
| WO | WO 01/60547 A1 | 8/2001 |
| WO | WO 03/100164 A1 | 12/2003 |

OTHER PUBLICATIONS

European Search Report issued in European Patent Application No. 06832452.4-2314, mailed Jan. 15, 2010.

* cited by examiner

US 7,775,028 B2

ANNULAR METAL CORD AND ENDLESS METAL BELT

RELATED APPLICATIONS

This application is the U.S. National Phase under 35 U.S.C. §371 of International Application No. PCT/JP2006/322391, filed on Nov. 9, 2006, which in turn claims the benefit of Japanese Application No. 2005-326286, filed on Nov. 10, 2005, and Japanese Application No. 2006-302616, filed on Nov. 8, 2006, the disclosures of which Applications are incorporated by reference herein.

TECHNICAL FIELD

The present invention relates to an annular metal cord and an endless metal belt.

BACKGROUND ART

Conventionally, as a type of endless metal belt, there has been known, as is described, for example, in Patent Document No. 1, an endless metal belt having a rectangular cross section which is made by bending a rolled strap material, welding both ends thereof together into a cylindrical shape and cutting it to a predetermined width.

In addition, as is described, for example, in Patent Document No. 2, there is known an endless belt in which a metal cord is used as a core material. The metal cord, which constitutes the core material, includes at least one filament making up a central core and a plurality of filaments which are wound around the central core.

Patent Document No. 1: JP-A-2003-236610
Patent Document No. 2: JP-A-4-307146

DISCLOSURE OF THE INVENTION

Problem that the Invention is to Solve

Since the endless metal belt described in Patent Document No. 1 has the rectangular cross section, the endless metal belt is liable to be twisted and is easy to be broken. In addition, when the metal cord described in Patent Document No. 2 is applied to an endless metal belt, both end portions of the metal cord needs to be joined together to be formed into an annular shape. As a method for joining together both the ends of the metal cord, there are considered a method for joining together both end portions of the metal cord end and a method for joining together both end portions of each of the filaments which make up the metal cord. In the method for joining together both the end portions of the metal cord, since the metal cord is joined at a single location, a complete rupture of the metal cord becomes easy to be caused. On the other hand, in the method for joining together both the end portions of each of the filaments, since the end portions of the filament have to be joined together after they are untwisted and then the end portions of the filament have to be re-twisted after the end portions are joined together, the twisted state differs between the connected portion and the other portion of the metal cord, and hence, there is caused a fear that the mechanical strength of the connected portion is decreased. As a result of this, the metal cord becomes easy to be ruptured. In addition, in the method for joining together both the end portions of each of the filaments, the process relating to the joining becomes complex and troublesome, which makes the production thereof difficult.

Then, an object of the invention is to provide an annular metal cord and an endless metal belt which are difficult to be ruptured and easy to be produced.

Means for Solving the Problem

An annular metal cord of the invention is characterized by including (1) an annular core portion formed by connecting together ends of a first strand material which is made up of a plurality of first twisted metal filaments and (2) an outer layer portion formed by winding a second strand material made up of a plurality of second twisted metal filaments around the annular core portion spirally and a plurality of rounds in such a manner as to cover an external circumferential surface of the annular core portion, wherein (3) the second strand material which forms the outer layer portion is wound at a predetermined winding angle relative to a center axis of the annular core portion, and a winding initiating end portion and a winding terminating end portion of the second strand material are connected together.

In this way, since the second strand material which is similarly made up of the plurality of twisted metal filaments is wound around the first strand material which is made up of the plurality of twisted metal filaments, the annular metal cord can be made sturdy. Since both the ends of the first strand material are connected together when the first strand material is formed into the annular shape and both the ends of the second strand material are connected together after it has been wound around the first strand material, the first strand material and the second strand material are connected separately. Consequently, when compared with a case where the first strand material and the second strand material would be connected altogether at one location, the possibility of complete rupture of the annular metal cord can be suppressed. Since the both ends of the first strand material are connected together to be formed into the annular core portion, the second strand material can be wound around the annular core portion as a base. As a result thereof, the annular metal cord having large rupture strength can be obtained.

When forming the outer layer portion, it is not that a plurality of second strand materials are wound around the first strand material but that the second strand material is wound around the first strand material a plurality of rounds. Consequently, there only has to be the single second strand material. As a result, when compared with a case where a plurality of second strand materials would be necessary, the number of connecting locations can be decreased, and therefore, not only can the rupture strength of the annular metal cord be increased further but also the production thereof can be facilitated. Since the winding of the second strand material is performed at the predetermined winding angle, the winding of the second strand material is not disturbed, thereby making it possible to obtain the annular metal cord having a uniform surface state. Since an external force is allowed to be applied uniformly to the annular metal cord having the uniform surface state, the reduction in rupture strength can be suppressed.

The connecting portion of the first strand material and the connecting portion of the second strand material are preferably located in different positions in a circumferential direction of the annular core portion. Simultaneous ruptures of the annular core and the outer layer portion are made difficult to occur by causing the connecting portions to deviate from each other. As a result, the reduction in rupture strength of the annular metal cord can be suppressed.

Preferably, both the ends of the first strand material are connected together by virtue of welding, and the winding initiating end portion and the winding terminating end portion of the second strand material are connected together by a connecting member made of a metal. Since both the ends of the first strand material are joined together by virtue of welding, the annular core portion can be obtained which has almost no increase in diameter at the connecting portion. The second strand material can be wound easily around the annular core portion like this. In addition, since the connecting member is used to connect the second strand material, connecting work can easily be performed.

Preferably, the connecting member exhibits substantially a cylindrical shape, and hole portions each having a polygonal cross section are provided in the connecting member so that the winding initiating end portion and the winding terminating end portion of the second strand material are inserted thereinto, respectively. Gaps are eventually formed between an inner wall of the connecting member and the second strand material at portions which correspond to corners of the hole portion. The gaps will function as a space relieving the deformed material when clamping the connecting member after the second strand member is inserted thereinto. Consequently, since the deformation of an external surface of the connecting member can be suppressed, the annular metal cord having the uniform surface state can be obtained in a more ensured fashion.

Preferably, the hole portions are recess portions which are provided at both ends of the connecting member, and a partition wall is provided between the recess portion at one end of the connecting member and the recess portion at the other end of the connecting member. By providing the partition wall between the recess portion and the recess portion, that is, at a central portion of the connecting member, the connecting member can be made difficult to be bent and cracked.

Preferably, a material of the first metal filament is an alloy steel which contains C: 0.08 to 0.27 mass percent, Si: 0.30 to 2.00 mass percent, Mn: 0.50 to 2.00 mass percent, and Cr: 0.20 to 2.00 mass percent; at least any one of Mo: 0.01 to 1.00 mass percent; Ni: 0.10 to 2.00 mass percent; Co: 0.10 to 2.00 mass percent, and W: 0.01 to 1.00 mass percent, at least any one of Al, Nb, Ti and V which are each in the range of 0.001 to 0.10 mass percent, and Fe and impurities which are inevitably mixed thereinto to fill the remaining portion. By being configured like this, the first strand material can have superior weldability and heat resistance.

Preferably, the diameter of the first metal filament is 0.06 to 0.40 mm. By being configured like this, the first strand material is allowed to have an appropriate rigidity, and the fatigue resistance thereof can be increased. In addition, since the first strand material which makes up the annular core portion is positioned at a cross sectional center of the annular metal cord, stress becomes smaller than the second strand material in such a state the annular metal cord is bent. Because of this, the diameter of the first metal filament is increased within the range of 0.06 to 0.40 mm so as to be thicker than the second metal filament to thereby increase the rigidity thereof.

Preferably, the diameter of the second metal filament is 0.06 to 0.30 mm. By being configured like this, the second strand material is allowed to have an appropriate rigidity, and the fatigue resistance can be increased. More preferably, the diameter of the second metal filament is 0.06 to 0.22 mm.

Preferably, the first strand material and the second strand material have the same diameter, or the diameter of the first strand material is larger than the diameter of the second strand material. By being configured like this, the second strand material can be wound around an outer circumferential surface of the annular core portion substantially without any gap. In particular, with the annular metal cord constructed to have a finely compacted twist cross section which is advantageous in saving space, basically a configuration is adopted in which a single annular core portion is provided, and in a first outer layer portion, six second strand materials are disposed around the annular core portion, and in a second outer layer portion, twelve second strand materials are disposed. However, in the event that the first strand material and the second strand material have the same diameter, due to wire diameter tolerance, when the second strand material is wound around the first outer layer portion six rounds, an arrangement of the strand material which equals six strand materials becomes difficult, resulting in a situation in which portions of the second strand material interfere with each other or the contact of the second strand material with the annular core becomes uneven. Then, in the event that the diameter of the first strand material is larger than the diameter of the second strand material, the drawback just mentioned can be avoided.

Preferably, a twist direction of the first metal filaments in the first strand material and a twist direction of the second metal filaments of the second strand material are the same, and the twist direction of the first metal filaments in the first strand material and the second metal filaments of the second strand material and a winding direction of the second strand material are opposite. By being configured like this, after the winding of the second strand material 2 has been completed, the annular metal cord can be obtained which has a surface appearance having few irregularities. In addition, the annular metal cord can be made difficult to be twisted.

Preferably, a winding angle of the second strand material relative to a center axis of the annular core portion is 4.5 to 13.8 degrees. By being configured like this, winding work of the second strand material is facilitated. In addition, the annular metal code can be obtained which has an appropriate ductility and in which unwinding of the second strand material which leads to loosening therein is prevented.

Preferably, the second strand material is wound around the outer circumferential surface of the annular core portion six to eight rounds. By being configured like this, since the outer layer portion is allowed to cover the annular core portion densely, the annular metal code can be made stable in a geometrical fashion. As a result, the annular metal code can be obtained in an ensured fashion which has a superior breaking strength and which is made difficult to be deformed in a radial direction.

Preferably, a low temperature annealing treatment is given to the annular core portion and the outer layer portion. By being configured like this, internal strain in the first metal filaments and the second metal filaments can be removed.

In addition, an endless metal belt of the invention is characterized by including the annular metal code that has been described heretofore. By utilizing the annular metal code described above, the endless metal belt can be obtained which has superior breaking strength and fatigue resistance and which is easy to be produced.

Preferably, a plurality of elements which are assembled together in a circumferential direction of the annular metal cord are brought into abutment with the annular metal code and each have an accommodating groove which accommodates therein part of the annular metal code. By being configured like this, the positional deviation of the annular metal cord relative to the elements is suppressed, thereby making it possible to prevent the disengagement of the elements from the annular metal code.

Preferably, the plurality of elements which are assembled together in the circumferential direction of the annular metal cord each include a pulley abutment surface which can be brought into abutment with a pulley on an outer circumferential side and an inner circumferential side of the annular metal cord. By being configured like this, a contact area of the element to the pulley can be secured largely, thereby making it possible to realize an increase in torque transmission amount.

Preferably, a pitch position of the plurality of elements which are assembled together in the circumferential direction of the annular metal cord is a position which substantially coincides with a rotationally running surface of the annular metal cord. By being configured like this, the elements are prevented from slipping relative to the running of the annular metal cord when they bite into pulleys, there by making it possible to provide proper transmission efficiency. Note that the pitch position means a position where the elements lying adjacent to each other in the circumferential direction are brought into contact with each other when the end less metal belt is wound around the pulleys to extend therebetween.

Advantage of the Invention

According to the invention, the annular metal cord and the endless metal belt can be provided which have superior breaking strength and fatigue resistance and which are easy to be produced. Consequently, when the annular metal cord and the endless metal belt of the invention are used on an industrial machine, the industrial machine can be made to have superior durability.

BRIEF DESCRIPTION OF THE INVENTION

FIG. 1 A perspective view of an annular metal cord according an embodiment.

Figure 2:
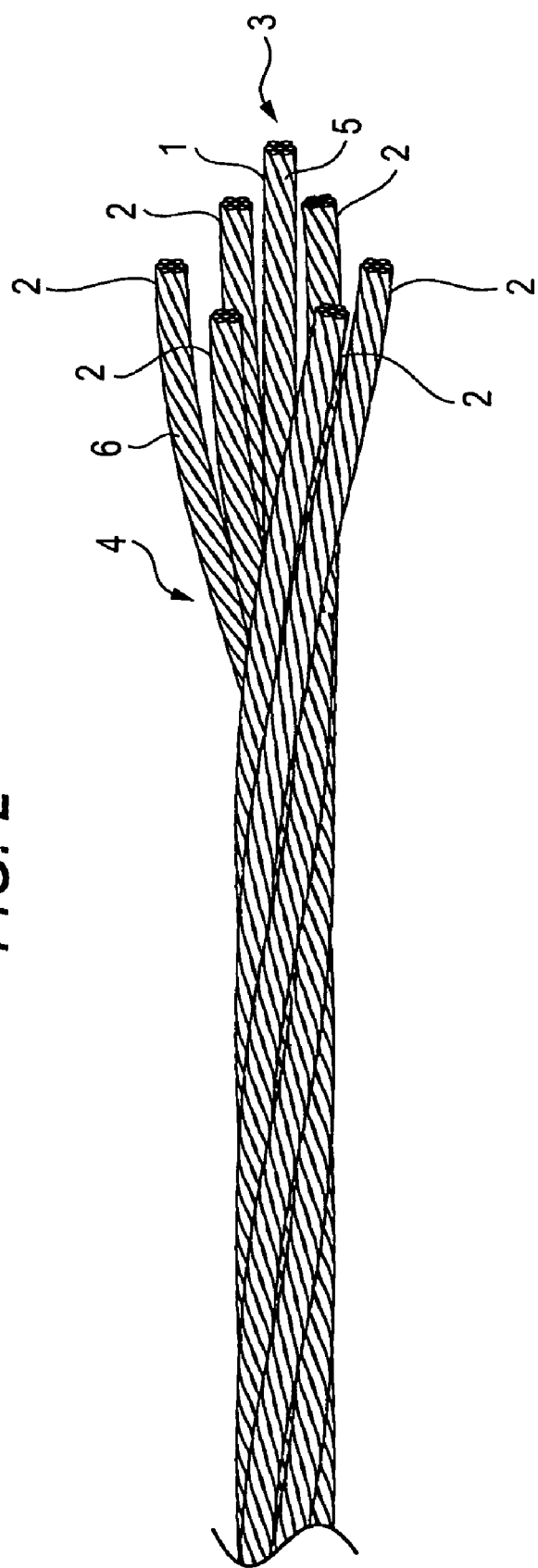

FIG. 2 A perspective view in radial cross section showing the annular metal cord according to the embodiment.

Figure 3:
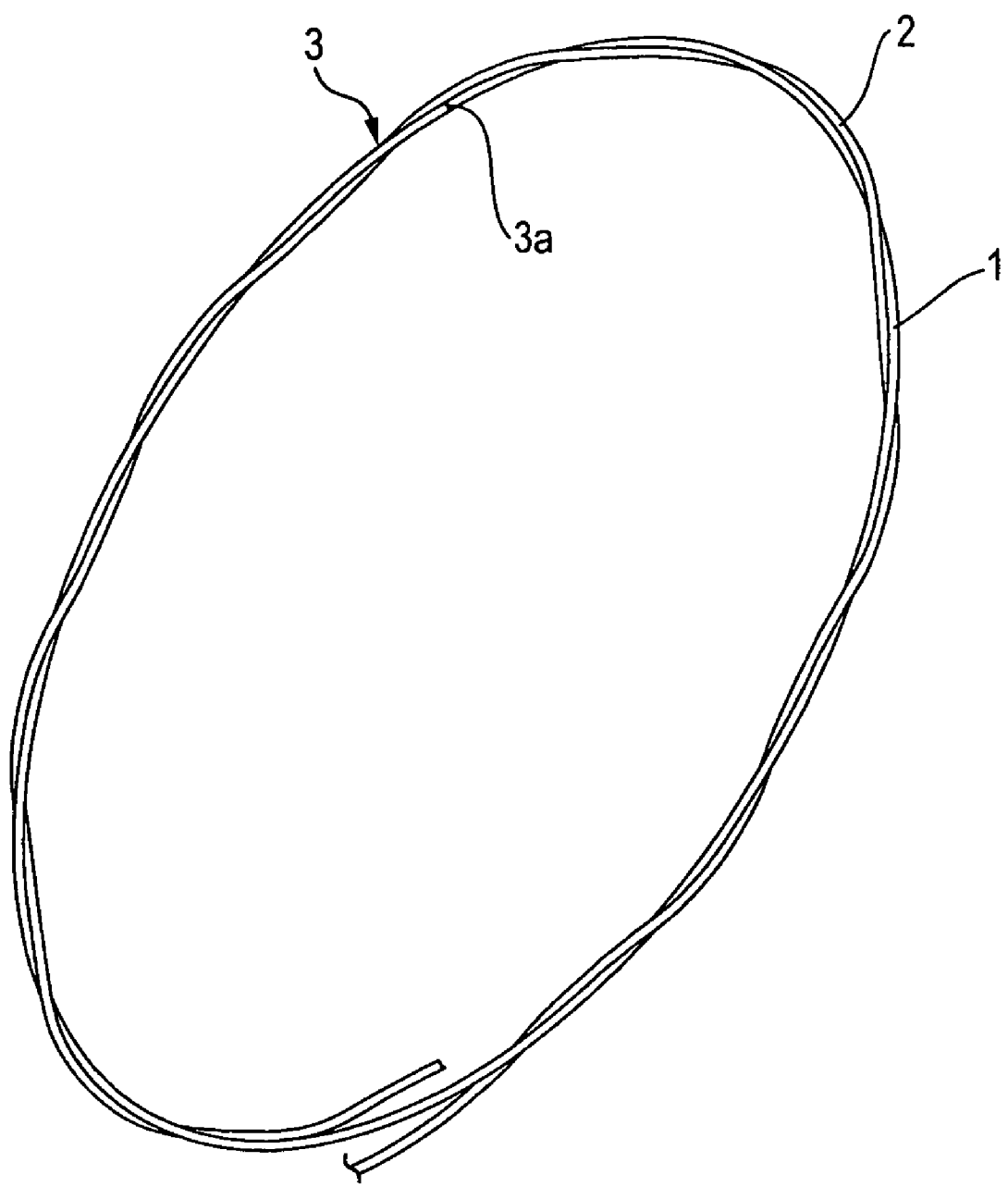

FIG. 3 A perspective view showing a state in which a second strand material is wound around an annular core portion which is included in the annular metal cord according to the embodiment one time.

Figure 4:
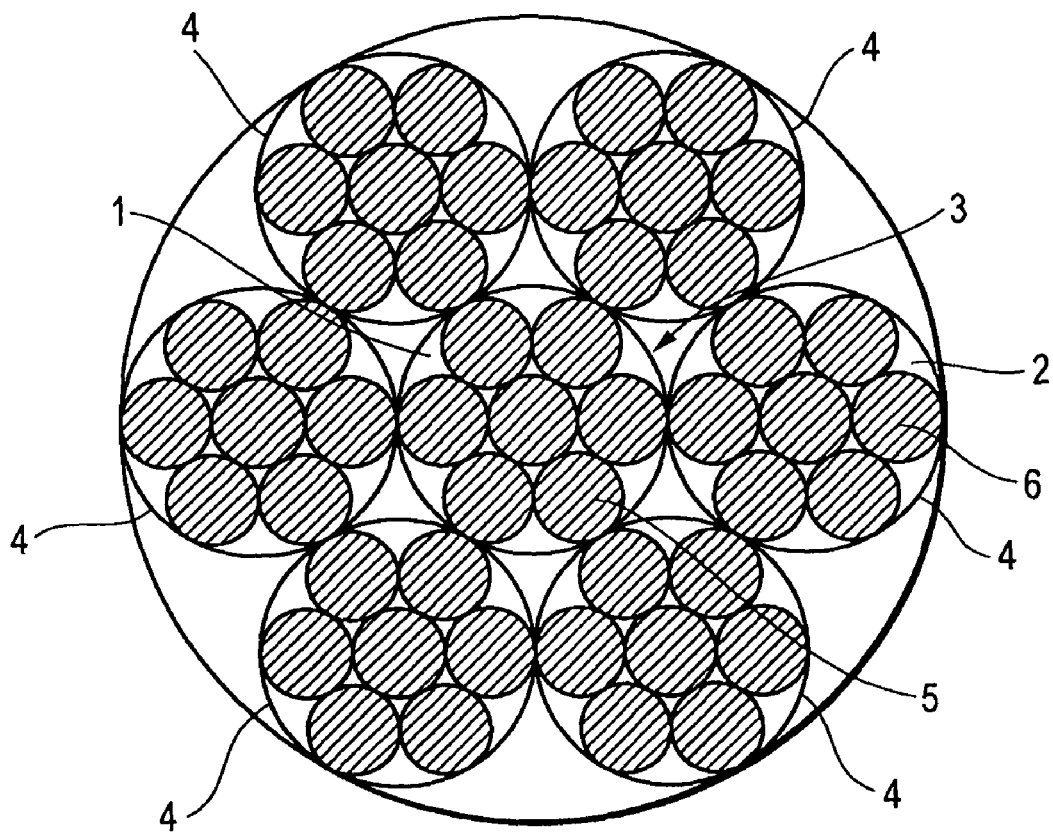
Figure 4:
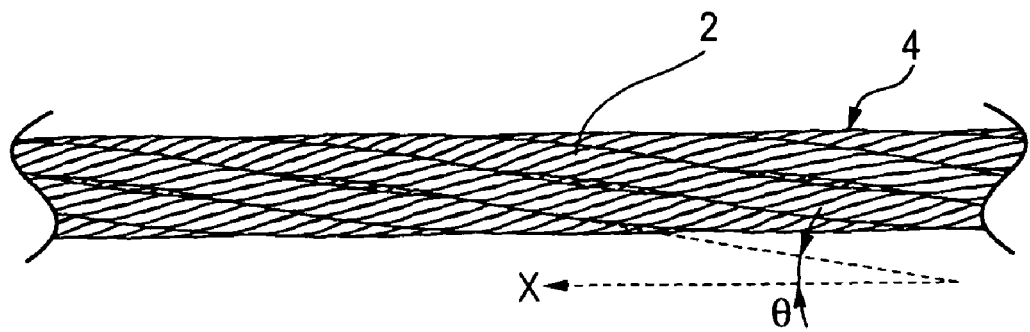

FIG. 4($a$) is a radial sectional view showing the annular metal cord according to the embodiment, and ($b$) is a side view of the annular metal cord.

Figure 5:
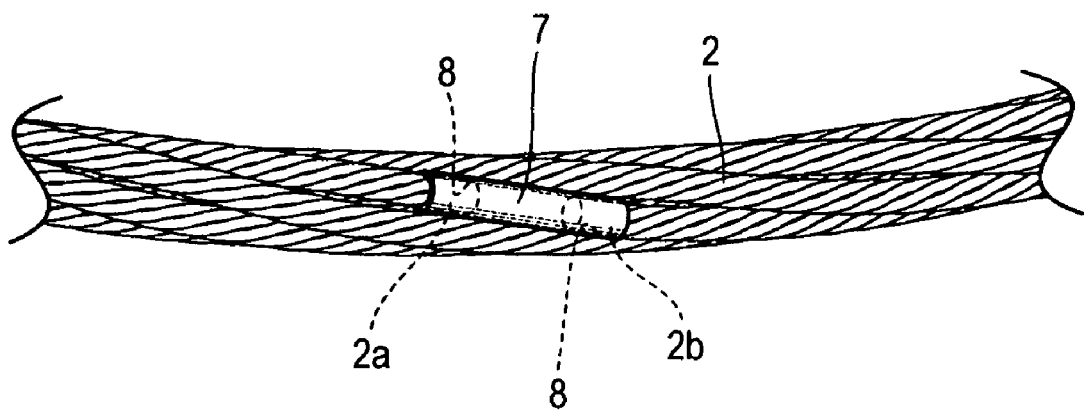

FIG. 5 An enlarged perspective view showing part of the annular metal cord according to the embodiment.

Figure 6:
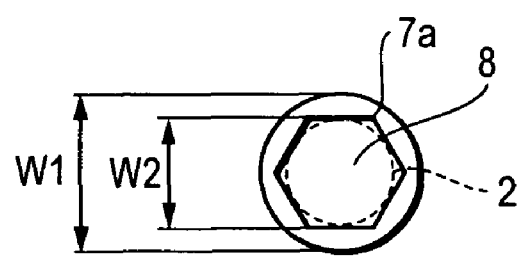
Figure 6:
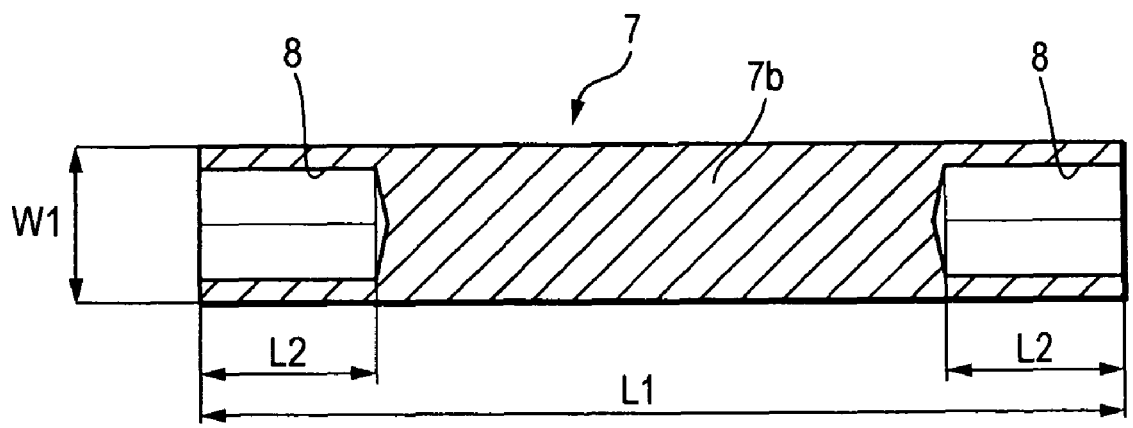

FIG. 6($a$) is a side view of a connecting member which is included in the annular metal cord according to the embodiment, and ($b$) is a sectional view of the connecting member.

Figure 7:
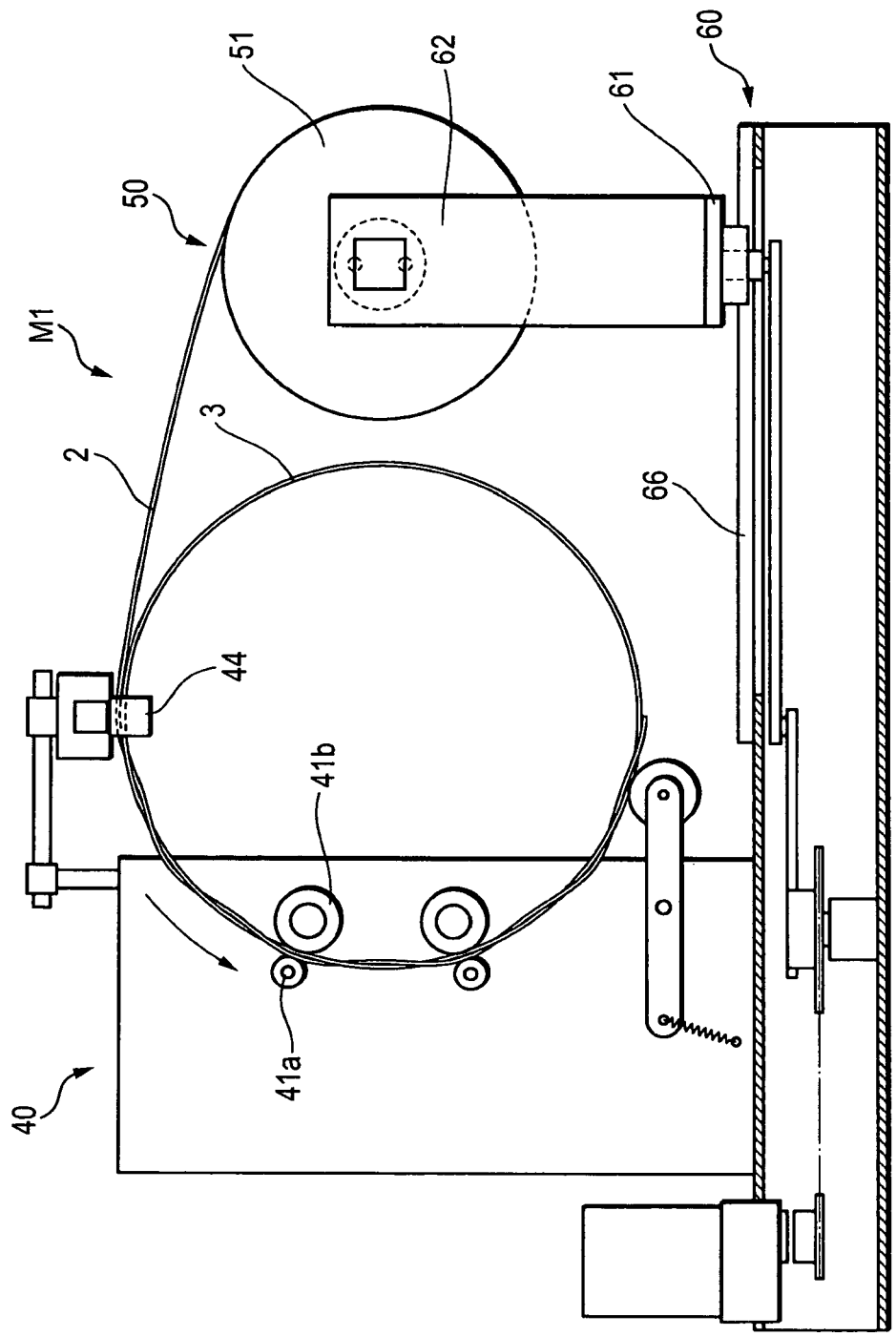

FIG. 7 A front view showing an example of a production system for producing the annular metal cord according to the embodiment.

Figure 8:
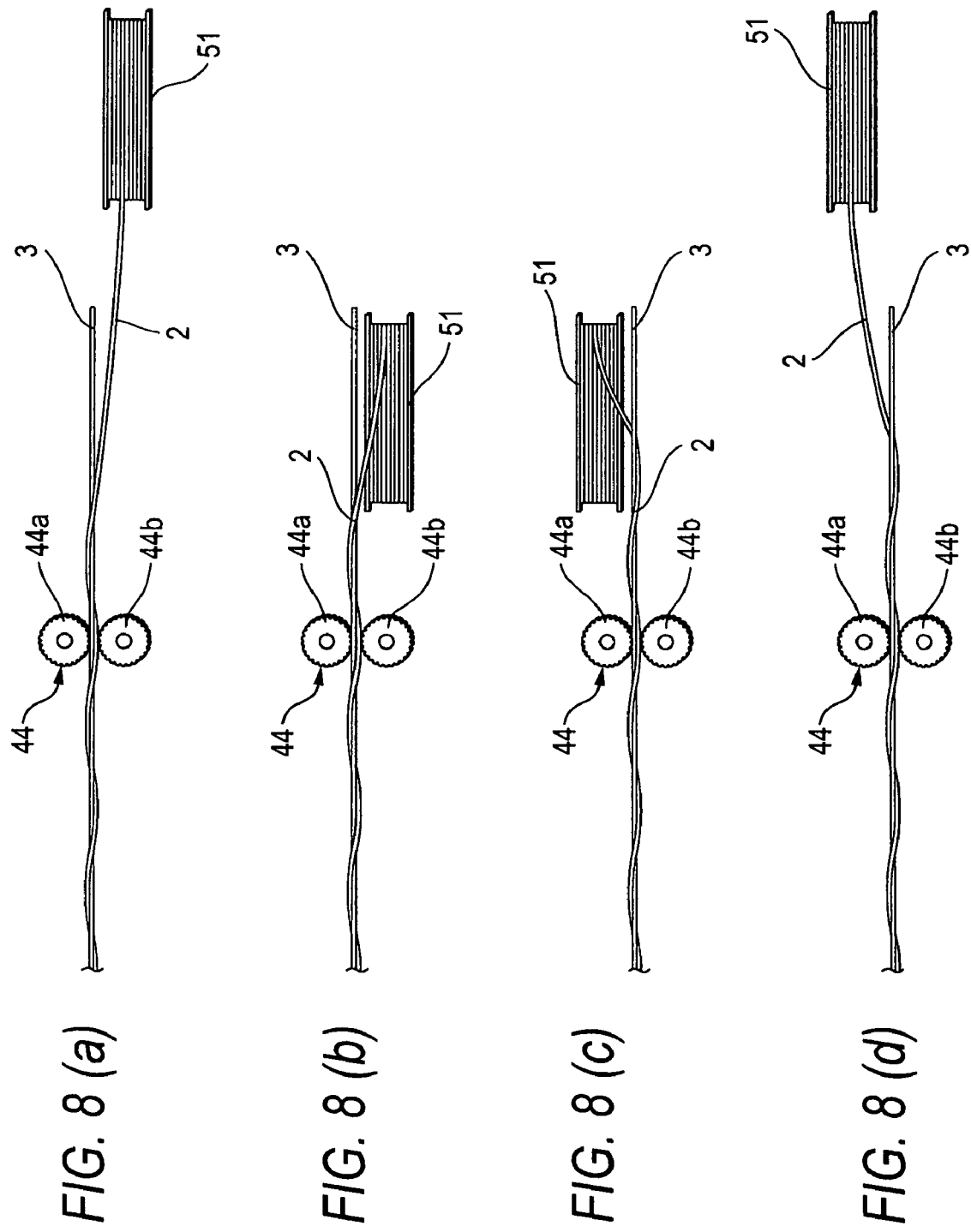

FIG. 8 A conceptual diagram resulting when viewing from the top a traveling state of a reel when producing the annular metal cord according to the embodiment.

Figure 9:
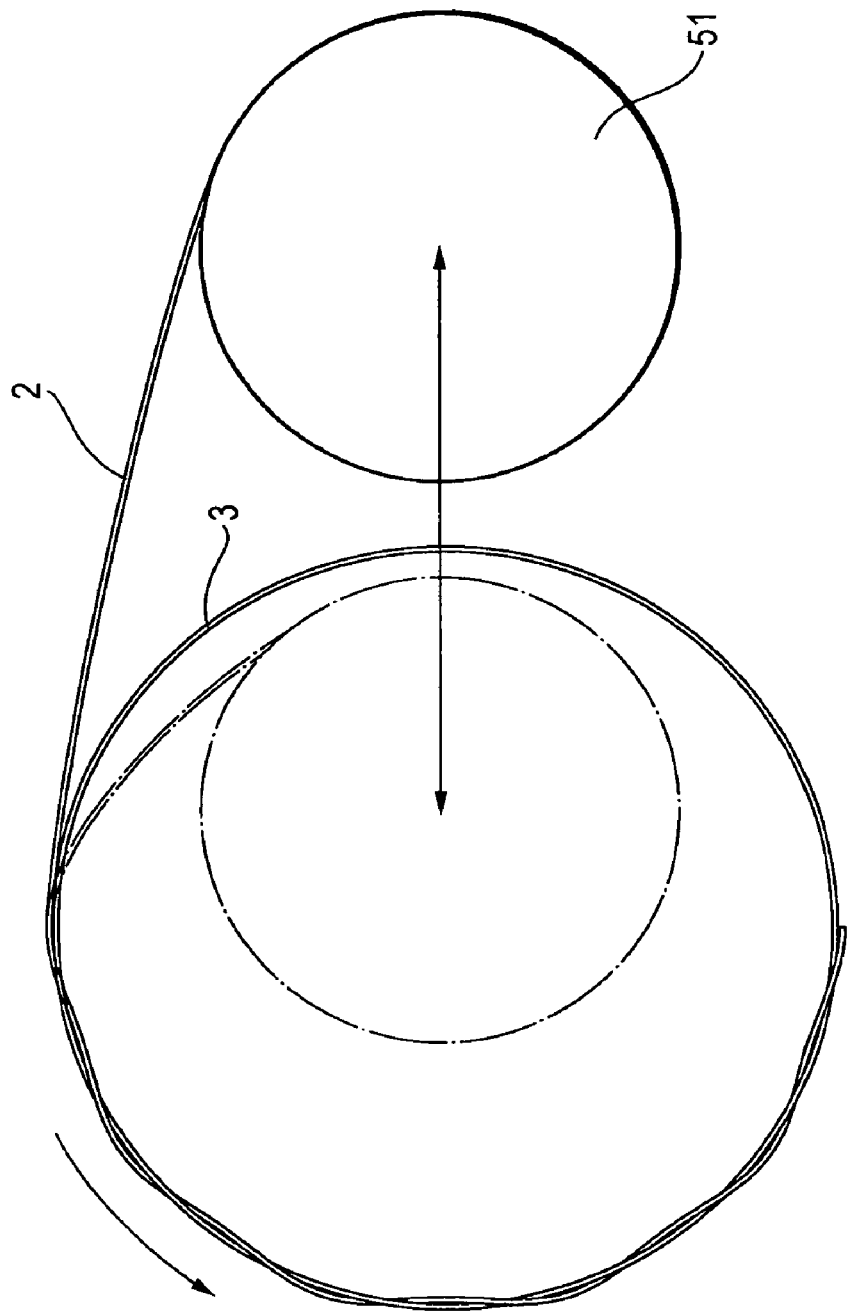

FIG. 9 A conceptual diagram resulting when viewing from the front the traveling state of the reel when producing the annular metal cord according to the embodiment.

Figure 10:
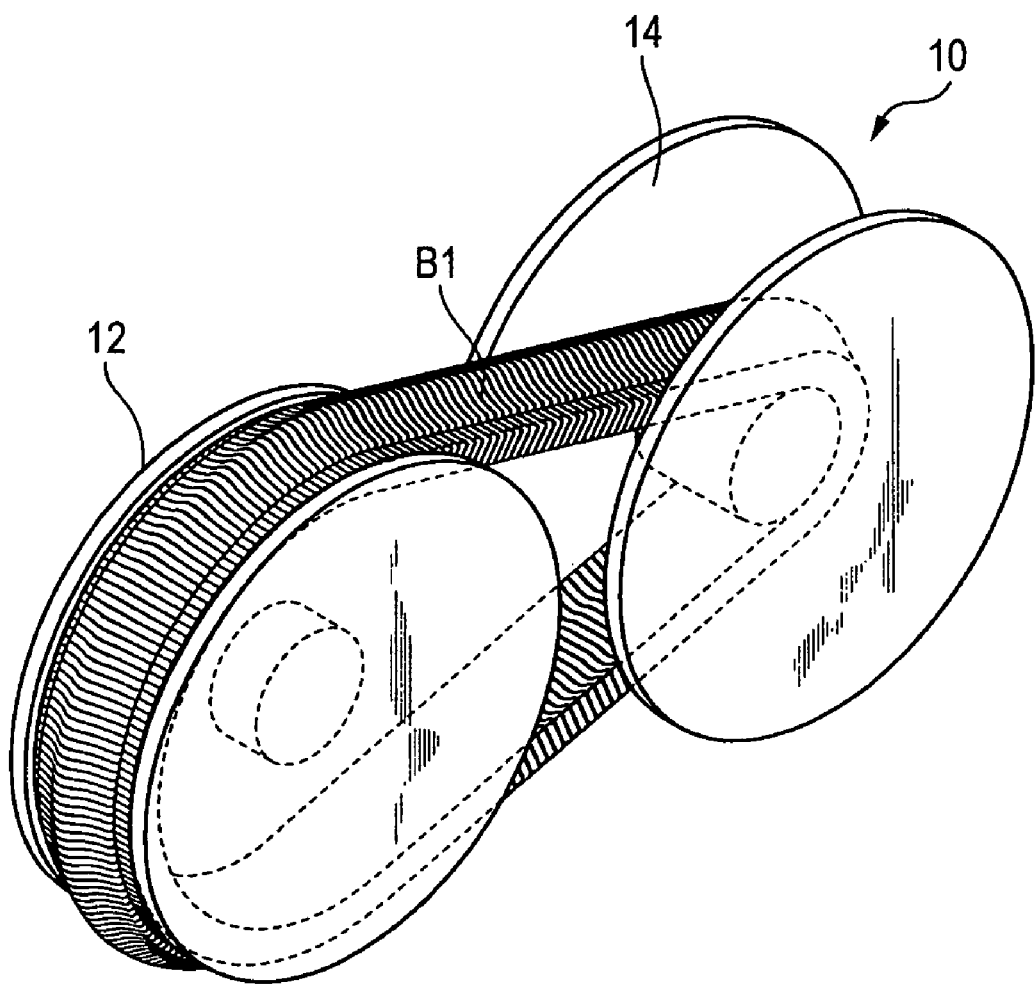

FIG. 10 A diagram showing a state in which an endless metal belt according to the embodiment is in use.

Figure 11:
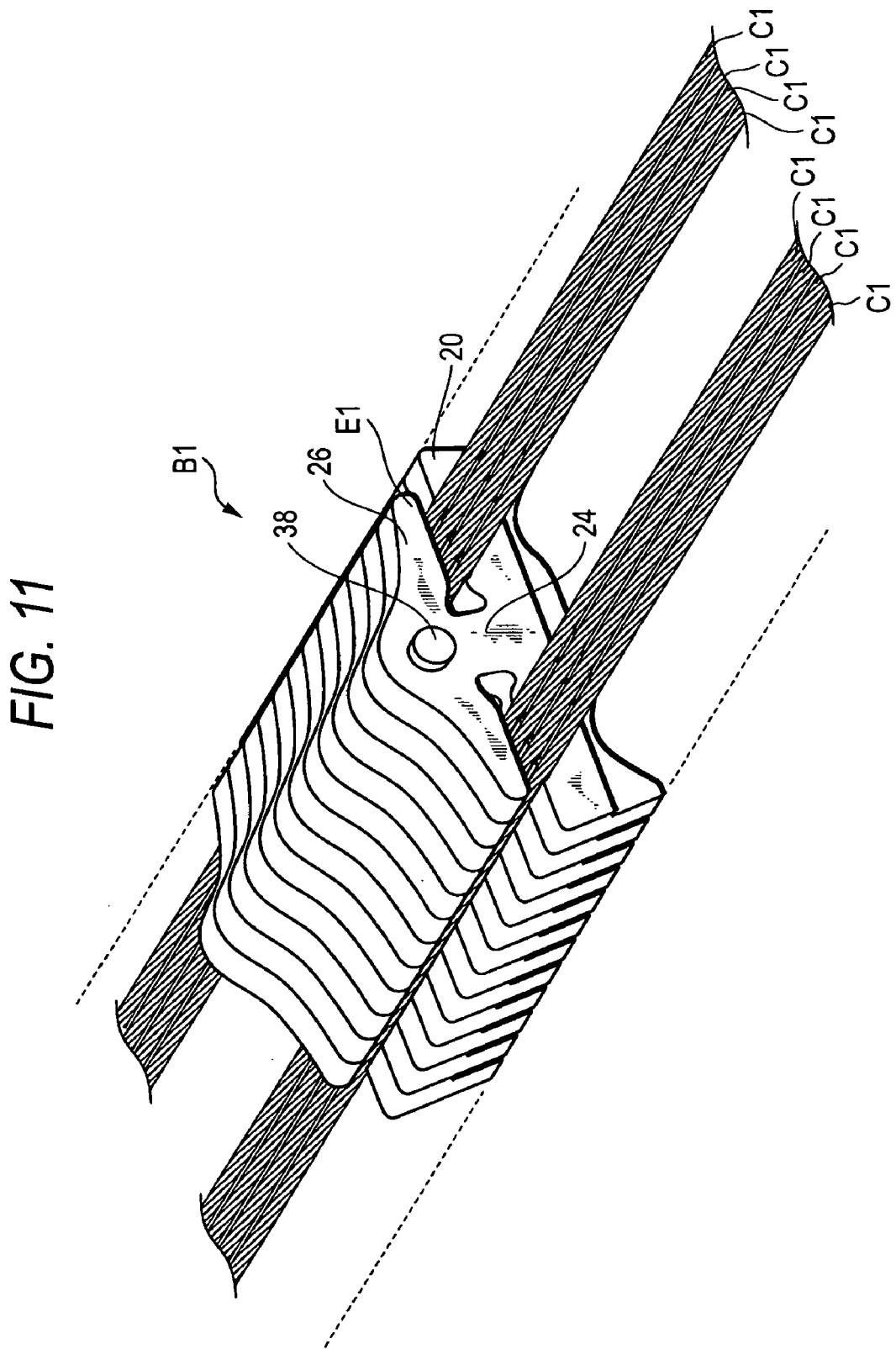

FIG. 11 A partially perspective view showing the endless metal belt according to the embodiment.

Figure 12:
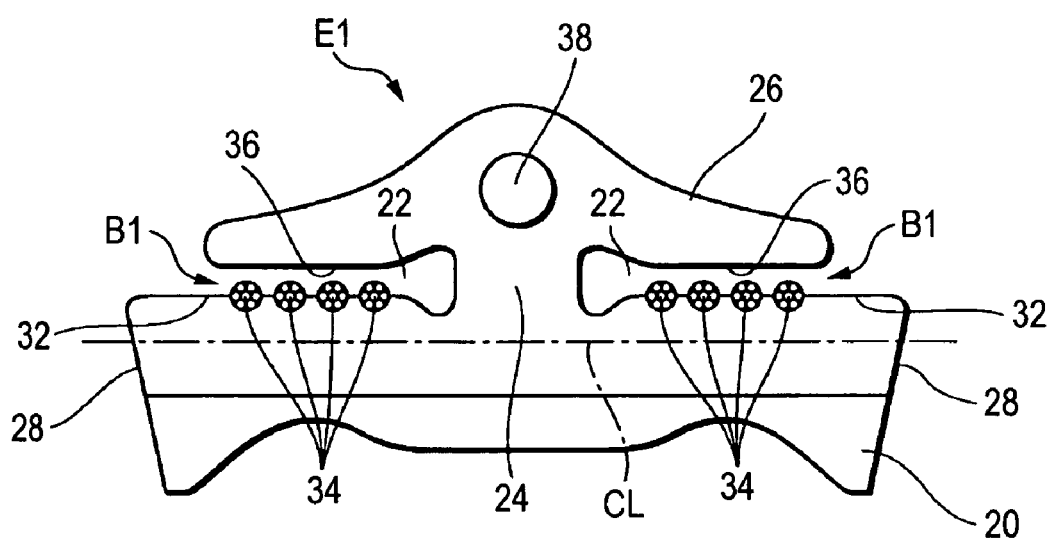

FIG. 12 A side view of an element included in the endless metal belt according to the embodiment.

Figure 13:
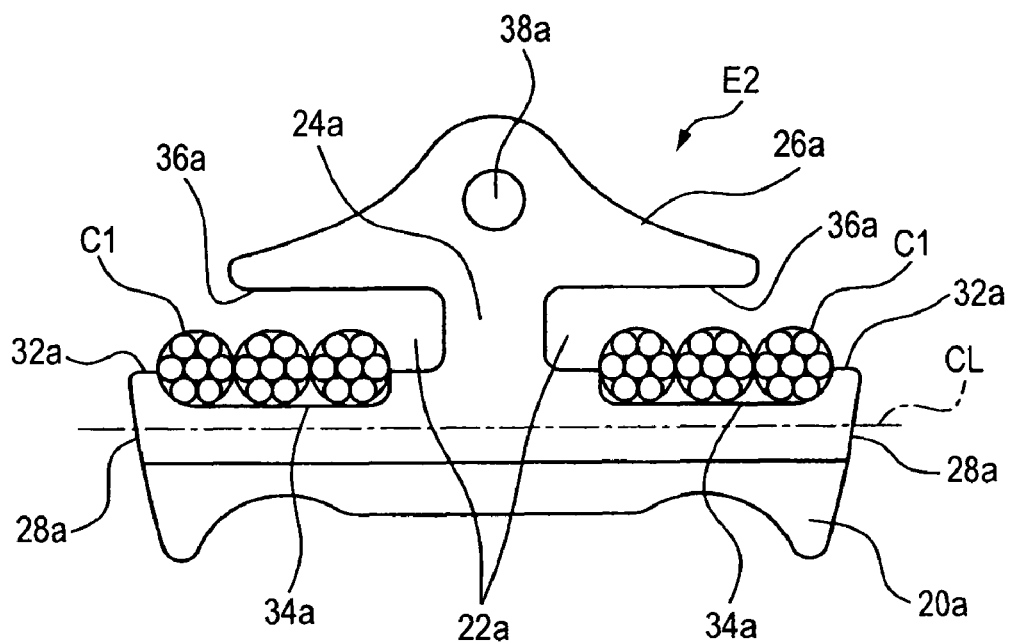

FIG. 13 A side view showing another example of an element included in the endless metal belt according to the embodiment.

Figure 14:
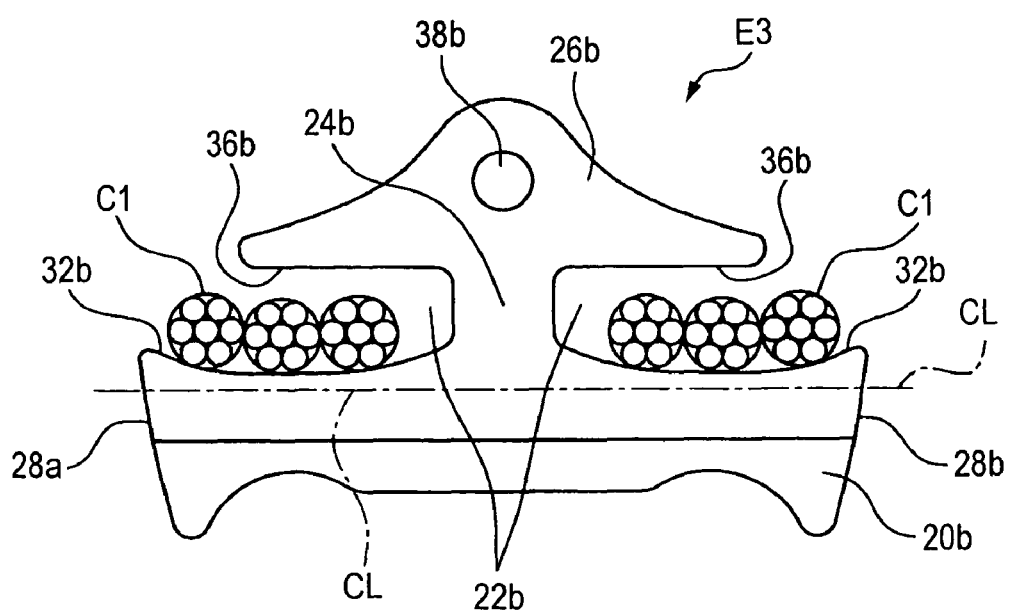

FIG. 14 A side view showing a further example of an element included in the endless metal belt according to the embodiment.

Figure 15:
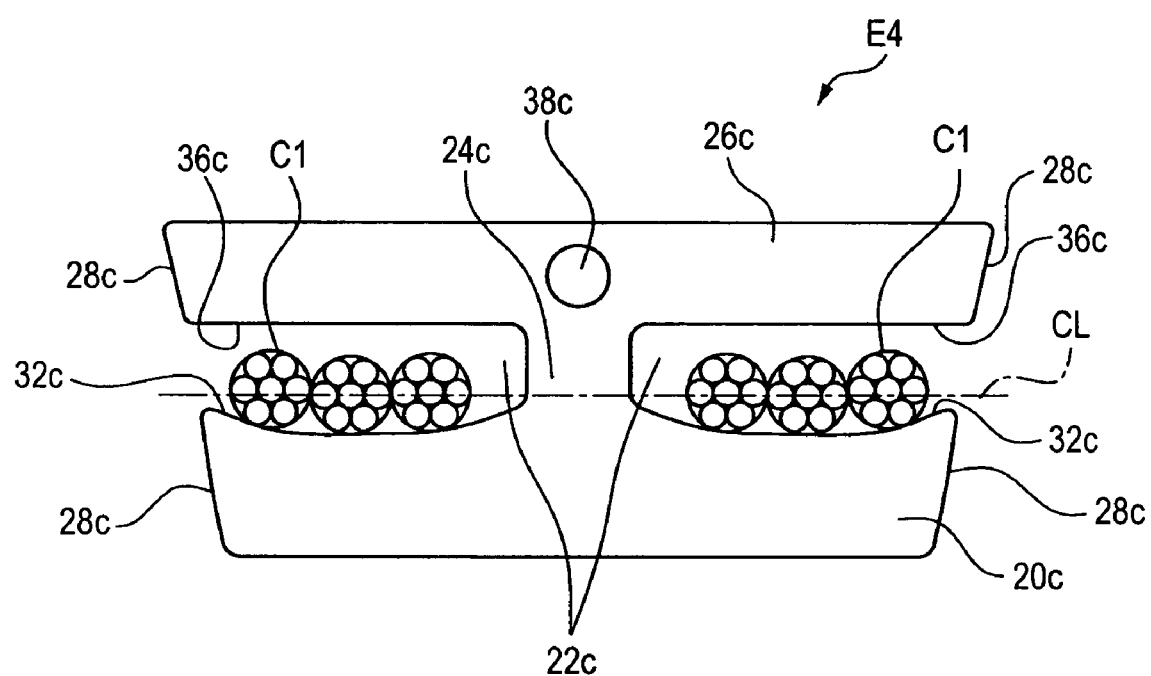

FIG. 15 A side view showing an example of an element included in the endless metal belt according to the invention.

Figure 16:
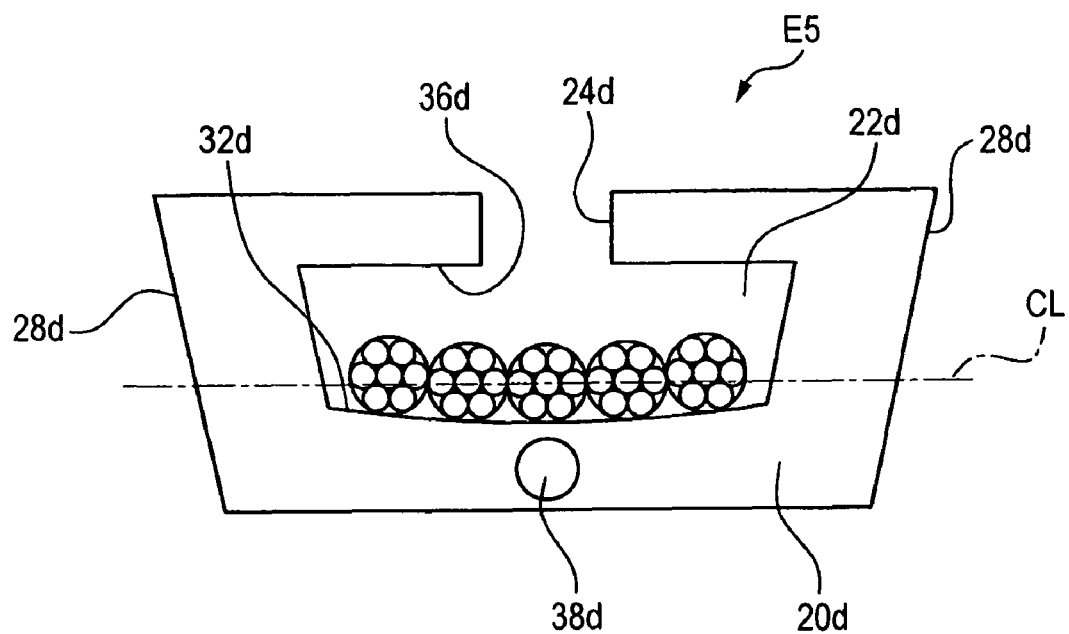

FIG. 16 A side view showing another example of an element included in the endless metal belt according to the invention.

Figure 17:
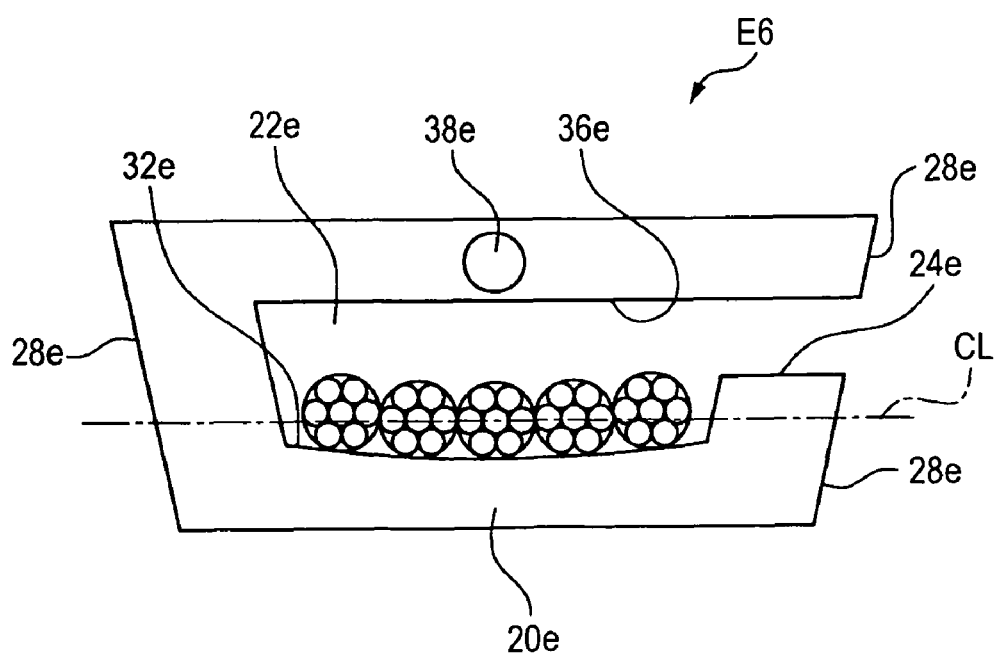

FIG. 17 A side view showing a further example of an element included in the endless metal belt according to the embodiment.

DESCRIPTION OF REFERENCE NUMERALS AND CHARACTERS

1: first strand material; 2: second strand material; 3: annular core portion; 3a: connecting portion; 4: outer layer portion; 5: first metal filament; 6: second metal filament; 7 connecting member; 7b: partition wall; 8: recess portion; B1: endless metal belt; C1: annular metal cord.

BEST MODE FOR CARRYING OUT THE INVENTION

Hereinafter, referring to the accompanying drawings, a preferred embodiment of the invention will be described in detail. Note that in the description, like reference numerals used for like elements or elements having like functions, so as to omit the repetition of a similar description.

An annular metal cord according an embodiment will be described by reference to the drawings. FIG. 1 is a perspective view of an annular metal cord according the embodiment, and FIG. 2 is a perspective view in radial cross section showing the annular metal cord according to the embodiment. FIG. 3 is a perspective view showing a state in which a second strand material is wound around an annular core portion which is included in the annular metal cord according to the embodiment one time. FIG. 4($a$) is a radial sectional view showing the annular metal cord according to the embodiment, and FIG. 4($b$) is a side view of the annular metal cord according to the embodiment. FIG. 5 is an enlarged perspective view showing part of the annular metal cord according to the embodiment, FIG. 6($a$) is a side view of a connecting member which is included in the annular metal cord according to the embodiment, and FIG. 6($b$) is a sectional view of the connecting member which is included in the annular metal cord according to the embodiment.

As is shown in FIGS. 1 and 2, an annular metal cord C1 is such as to include an annular core portion 3 and an outer layer portion 4 which covers an outer circumferential surface of the annular core portion 3.

The annular core portion 3 is formed by connecting both ends of a first strand member 1. Because of this, the annular core portion 3 has a connecting portion 3a as is shown in FIG. 3. In this embodiment, both the ends of the first strand material 1 are connected together by virtue of welding. In the event that the ends are welded together by virtue of welding, an increase in diameter at the connecting portion is made difficult to occur when compared with cases where the ends are connected together by other methods. Because of this, the annular core portion can be obtained in which smooth winding of a second strand material 2 can be performed even at the connecting portion.

As is shown in FIG. 4($a$), the first strand material 1 is such as to be made up of a plurality of first metal filaments 5 which are twisted. In this embodiment, as is shown in FIG. 2, the first strand material 1 is such that a single first metal filament 5 is provided as a center and six first metal filaments 5 are wound around an outer circumferential surface of the first metal strand 5 in an S twist fashion. In this way, since a geometrically stable 7 twist is used for the first strand member 1, the first strand member 1 is sturdy and is made difficult to be ruptured.

The first metal filament is made of an alloy steel, which contains, as materials thereof, C: 0.08 to 0.27 mass percent, Si: 0.30 to 2.00 mass percent, Mn: 0.50 to 2.00 mass percent, and Cr: 0.20 to 2.00 mass percent. In addition, the alloy steel contains at least any one of Mo: 0.01 to 1.00 mass percent; Ni: 0.10 to 2.00 mass percent; Co: 0.10 to 2.00 mass percent, and W: 0.01 to 1.00 mass percent. Furthermore, the alloy steel contains at least any one of Al, Nb, Ti and V which are each in the range of 0.001 to 0.10 mass percent, and the remaining portion thereof is made up of Fe and impurities which are inevitably mixed thereinto. Since the first metal filament 5 made of these materials is used for the first strand material 1, the first strand material 1 has good weldability and superior heat resistance.

The first metal filament 5 has a diameter of 0.06 to 0.40 mm. In case, since the diameter of the first metal filament 5 is larger than 0.06 mm, the rigidity of the first strand material 1 becomes sufficient, and the annular core portion 3 can be made difficult to be deformed. Since the diameter of the first metal filament 5 is smaller than 0.40 mm, the rigidity of the first strand material 1 becomes too large, whereby the annular metal cord C1 is allowed to be made such that fatigue rupture due to repeated stress is difficult to be generated.

In addition, since the first strand material 1 which makes up the annular core portion 3 is situated in a cross-sectional center of the annular metal cord C1, strain becomes small when compared with the second strand material 2 in such a state that the annular metal cord C1 is bent. Because of this, it is also possible that the diameter of the first metal filament 5 is increased to be thicker than a second metal filament 6 within the range of 0.06 to 0.40 mm, so as to increase the rigidity.

The outer layer portion 4 is formed by winding the second strand material 2 around the annular core portion 3 as an axial center. As is shown in FIG. 4(a), the second strand material 2 is such as to be made up of a plurality of second metal filaments 6 which are twisted.

High carbon steel containing 0.70 or more mass percent of C is used as a material for the second metal filament 6. By selecting the material containing 0.70 or more mass percent of C, the second metal filament 6 can be made to be a steel wire which has superior breaking strength. Note that although the second metal filament 6 may be made of the same material as that of the first metal filament 5, the material containing 0.70 or more mass percent of C is preferably used for the second metal filament 6 which is not connected by virtue of welding.

The diameter of the second metal filament 6 is the same as the diameter of the first metal filament 5 or smaller than the diameter of the first metal filament 5 and is 0.06 to 0.30 mm. The diameter of the second metal filament 2 is more preferably 0.06 to 0.22 mm. When the second strand material 2 is made of the second metal filament 6 which has the diameter like this, as with the first strand material 1, the second strand material 2 can be obtained which has appropriate rigidity. Because of this, winding the second strand material 2 around the annular core portion 3 is facilitated, and unwinding of the second strand material 2 which leads to loosening therein is made difficult to occur.

In this embodiment, as is shown in FIG. 2, the second strand material 2 is such that six second metal filaments 6 are wound around an outer circumferential surface of a second metal filament 6 in an S twist fashion. Namely, since a geometrically stable 7 twist is used for the second strand material 2, the second strand material is made to be sturdy and hence difficult to be ruptured. The diameter, number and twisting manner of filaments are the same on the second strand material 2 and the first strand material 1. Alternatively, the diameter of the filament used for the first strand material 1 is larger than the diameter of the filament used for the second strand material 2. Consequently, the second strand material 2 has the same diameter as the first strand material 1, or the diameter of the first strand material is larger than the diameter of the second strand material 2.

The second strand material 2 is wound around the annular core portion 3 a plurality of rounds and is wound thereround spirally as is shown in FIGS. 2 and 3. The second strand material 2 is wound in such a manner as to produce no twist therein. By being wound in such a manner as to produce no twist therein, the second strand material 2 can be prevented from being unwound to be loosened.

In this embodiment, the second strand material 2 is wound around the outer circumferential surface of the annular core portion 3 six rounds. Since the second strand material 2 has the same diameter as that of the first strand material 1, the second strand material 2 is wound around the outer circumferential surface of the annular core portion 3 substantially without any gap. Consequently, the outer layer portion 4 eventually covers the annular core portion densely. As shown in FIG. 4(a), a cross section of the annular metal cord C1 results in a configuration in which six second strand materials 2 are arranged around the first strand material 1 which is the annular core portion 3. The resulting cross section becomes the same as one which results when the first strand material 1 or the second strand material 2 is wound in a 7 twist fashion. In this way, since the annular metal cord C1 has the geometrically stable construction, the annular metal cord C1 has superior breaking strength and fatigue resistance and is made difficult to be deformed in a radial direction.

As is shown in FIG. 4(a), the annular metal cord C1 has a finely compacted twist construction in cross section which is advantageous in saving space, and in a first outer layer portion, six second strand materials are arranged around the single annular core portion 3 and in a second outer layer portion, twelve second strand materials are arranged. However, in the event that the first strand material 1 and the second strand material 2 has the same diameter, depending upon wire diameter tolerance, when the second strand material 2 is wound six rounds in the first outer layer portion, the arrangement of six second strand materials becomes difficult, whereby portions of the second strand material 2 are caused to interfere with each other, or the contact of the second strand material 2 with the annular core portion 3 becomes uneven. Then, in the event that the diameter of the first strand material 1 is larger than the diameter of the second strand material 2, a drawback like that can be avoided.

As is shown in FIG. 3, the second strand material 2 is wound around the outer circumferential surface of the annular core portion 3 in a Z twist fashion. Since the first strand material 1 and the second strand material 2 are themselves formed in the S twist fashion, the annular metal code C1 is a combination of the S twist and the Z twist. Consequently, the annular metal cord C1 can be obtained which is difficult to be twisted and which has an external surface appearance of few irregularities.

In addition, the second strand material 2 is wound at a predetermined winding angle relative to a center axis of the annular core portion 3. Because of this, the second strand material 2 is wound without being disturbed, whereby the annular metal code C1 can be obtained which has a substantially uniform surface state. In this embodiment, as is shown in FIG. 4(b), the winding angle θ of the second strand material 2 relative to an X direction, that is, a direction in which the center axis of the annular core portion 3 extends is 4.5 to 13.8 degrees. By making the winding angle θ be larger than 4.5 degrees, the unwinding of the second strand material 2 which leads to loosening therein is made difficult to occur. By making the winding angle θ be smaller than 13.8 degrees, an excessive increase in ductility of the second strand material 2 can be prevented. Namely, by making the winding angle θ of the second strand material 2 be 4.5 to 13.8 degrees, the annular metal code C1 can be obtained which has appropriate ductility and which is easy to be bent. In the event that the annular metal cord C1 that is configured like this is used, for example, in an endless metal belt for a continuously variable transmission, which will be described later on, power transmission between a drive pulley and a driven pulley can be implemented with good accuracy.

As is shown in FIG. 5, a winding initiating end portion 2a and a winding terminating end portion 2b of the second strand material 2 are connected by a connecting member 7. By using the connecting member 7, the connection of the winding initiating end portion 2a and the winding terminating end portion 2b of the second strand material 2 is facilitated. The position of the connecting portion of the strand material 2 and the position of the connecting portion of the annular core portion 3 are different in a circumferential direction of the annular core portion 3. By causing the positions of the connecting portions to deviate from each other, simultaneous ruptures of the annular core portion 3 and the outer layer portion 4 can be suppressed.

The connecting member 7 is made of a metal such as brass. The connecting portion 7 exhibits substantially a cylindrical portion. The dimensions of the connecting member 7 are about 1.1 mm in diameter W1 and about 8 mm in length L1. As is also shown in FIGS. 6(a) and 6(b), recess portions 8 (hole portions) of a polygonal cross section are provided in both ends of the connecting member 7, respectively. The winding initiating end portion 2a of the second strand member 2 is inserted into one of the recess portions 8, while the winding terminating end portion 2b of the second strand material 2 is inserted into the other recess portion 8. More specifically, the recess portion 8 exhibits substantially a regular hexagonal shape. The dimensions of the recess portion 8 are, for example, about 1.5 mm in depth L2 and about 0.7 mm in breadth W2.

In the connecting member 7, a portion corresponding to an external wall of each of the recess portions 8 is clamped with a clamping tool. By clamping this portion, the winding initiating end portion 2a and the winding terminating end portion 2b of the second strand material 2 can be connected together via the connecting member 7. Since the cross section of the recess portion 8 is formed substantially into the regular hexagonal shape, gaps are formed between an inner wall of the connecting member 7 and the second strand material 2 at portions 7a which corresponds to corners. Since these gaps function as a space relieving the deformed material when the connecting member 7 is clamped, deformation in an external surface of the connecting member 7 can be suppressed.

A partition wall 7b is provided substantially at an axially central portion of the connecting member 7, that is, between the recess portion 8 and the recess portion 8.

Here, consider a cylindrical connecting member having a through hole in an interior thereof. When using the connecting member configured like this, the winding initiating end portion 2a and the winding terminating end portion 2b of the second strand material 2 are inserted into the through hole from both ends of the connecting member so that the end portions are connected together end to end within the through hole. Because of this, there is caused a possibility that bending and cracking is made to easily occur in the connecting member. In the event that bending or cracking occurs in the connecting member, there is caused a fear that the second strand material 2 within the through hole 2 is ruptured. In the event that the partition wall 7b is provided substantially at the central portion of the connecting member 7 as in this embodiment, bending and cracking are made difficult to occur in the connecting member 7, thereby making it possible to increase the mechanical strength of the connecting member 7.

In this way, the outer layer portion 4 is formed by connecting the winding initiating end portion 2a and the winding terminating end portion 2b of the second strand material 2 by the connecting member 7 after the second strand material 2 is wound around the annular core portion 3.

Following this, a production method of the annular metal cord C1 will be described. FIG. 7 is a front view showing an example of a production system for producing the annular metal cord C1. FIG. 8 is a conceptual diagram resulting when viewing from the top a traveling state of a reel when producing the annular metal cord C1.

FIG. 9 is a conceptual diagram resulting when viewing from the front the traveling state of the reel when producing the annular metal cord C1.

As is shown in FIG. 7, a production system M1 includes a driving unit 40, a supply section 50 and a sliding unit 60.

The driving unit 40 has pinch rollers 41a, 41b. The pinch rollers 41a, 41b are connected to a drive motor (not shown) for rotating the annular core portion 3 in a circumferential direction. A clamping unit 44 for guiding the annular core portion 3 is provided above the pinch rollers 41a, 41b. As is shown in FIG. 8, the clamping unit 44 is made up of rollers 44a, 44b. The rollers 44a, 44b align the annular core portion 3 perpendicular so as to suppress lateral oscillations and rotate the annular core portion 3 in the circumferential direction.

The sliding unit 60 has a traveling table 61, a stand 62 and a rail 66. The traveling table 61 reciprocates along the rail 66 by means of the drive motor (not shown). The stand 62 is provided on the traveling table 61, and the supply section 50 is set on the stand 62. The supply section 50 has a reel 51 around which the second strand material 2 is taken up. The supply section 50 supplies the second strand material 2 in a direction in which the annular core portion 3 is provided.

When the production system M1 which is configured as has been described above, the annular metal cord C1 is produced by way of the following processes.

Firstly, a winding initiating end of the second strand material 2 is temporarily fastened to the annular core portion using an adhesive tape. After having been temporarily fastened, the annular core portion 3 is caused to rotate in the circumferential direction, so that winding of the second strand material 2 around the annular core portion 3 is initiated.

The reel 51, around which the second strand material 2 is wound, reciprocates between an inside and an outside of the annular core portion 3, as is shown in FIG. 9. The reciprocation is performed along the rail 66. More specifically, the reel 51 lying outside the annular core portion 3 travels in a direction in which it approaches the annular core portion 3, as is shown in FIG. 8(a). When reaching the inside of the annular core portion 3, as is shown in FIG. 8(b), the reel 51 passes through a ring formed by the annular core portion 3, as is shown in FIG. 8(c). The reel 51, which has passed through the ring of the annular core portion 3, travels in a direction in which it travels away from the annular core portion 3 to reach again the outside of the annular core portion 3, as is shown in FIG. 8(d). After having reached the outside of the annular core portion 3, the reel 51 returns to the position shown in FIG. 8(a). By repeating FIGS. 8(a) to (d), the second strand material 2 is spirally wound around the outer circumferential surface of the annular core portion 3.

After the winding of the second strand material 2 has been completed, as is shown in FIG. 5, the winding initiating end portion 2a and the winding terminating end portion 2b of the second strand material 2 are inserted into the recess portions 8 of the connecting member 7, respectively, and the insertion portion is clamped from the outside with a clamping tool, whereby the outer layer portion 4 made up of the second strand material 2 can be obtained.

After the connecting member 7 is clamped, a low temperature annealing treatment is applied to the annular core portion 3 and the outer layer portion 4 that have been described above. More specifically, a heat treatment is applied to the annular core portion 3 and the outer layer portion 4 within a pressure chamber into which argon is introduced in a vacuum or reduced pressure atmosphere. A temperature at which the heat treatment is applied is in the range of 70 to 380 degrees. By the application of the heat treatment in this way, internal strain in the first metal filaments 5 and the second metal filaments 6 can be removed, thereby making it possible to obtain the annular metal cord C1 which is free from strain. When the annular metal cord C1 configured like this is used, for example, for an endless metal belt, which will be described later on, for a continuously variable transmission, the endless metal belt can be obtained which rotates without snaking. With the endless metal belt which rotates without snaking, since the belt is brought into contact with peripheral components in no case and hence is never worn, the high performance can be maintained over a long period of time.

Thus, as has been described heretofore, in this embodiment, since the second strand material 2, which is made up of the seven twisted second metal filaments 6, is wound around the first strand material 1, which is made up of the seven twisted first metal filaments 5, the annular metal cord C1 can be made sturdy. Since the first strand material 1 and the second strand material 2 are connected separately, when compared with the case where the first strand material 1 and the second strand material 2 are connected altogether at one location, the possibility of complete rupture of the annular metal cord C1 can be suppressed. Since the annular core portion 3 is made up of the first strand material 1 and the second strand material 2 is wound around the annular core portion 3 so configured as the axial center, the annular metal cord can be obtained which has large breaking strength. When forming the outer layer portion 4, it is not that a plurality of second strand materials 2 are wound around the annular core portion 3 but that the second strand material 2 is wound around the annular core portion 3 six rounds, there only has to be the single second strand material 2. Consequently, when compared with the case where the plurality of second strand materials 2 are used, not only can the breaking strength of the annular metal cord C1 be increased but also the production thereof can be facilitated. Since the winding of the second strand material 2 is performed at the predetermined winding angle, the winding of the second strand material 2 is not disturbed, thereby making it possible to obtain the annular metal cord C1 which has the substantially uniform surface state. Since external force is applied uniformly to the annular metal cord C1 configured like this, the reduction in breaking strength can be suppressed.

In addition, the connecting portion of the first strand material 1 and the connecting portion of the second strand material 2 are located in the different positions in the circumferential direction of the annular core portion 3. By causing the connecting portions to deviate from each other, since simultaneous ruptures of the annular core portion 3 and the outer layer portion 4 are made difficult to occur, the reduction in breaking strength of the annular metal cord C1 can be suppressed.

In addition, both the ends of the first strand material 1 are connected together by virtue of welding, and the winding initiating end portion 2a and the winding terminating end portion 2b of the second strand material 2 are connected together by the connecting member 7. In this case, in the first strand material 1, the connecting portion is made difficult to be ruptured, and in the second strand material 2, the connection is facilitated.

As this occurs, the connecting member 7 exhibits substantially the cylindrical shape, and the substantially regular hexagonal recess portions 8 are provided in both the ends of the connecting member 7 into which the winding initiating end portion 2a and the winding terminating end portion 2b of the second strand member 2 are inserted, respectively. The gaps are formed between the inner wall of the connecting member 7 and the second strand member 2 at the portions 7a in the connecting member 7 which correspond to the corners of the substantially regular hexagon. Consequently, when the connecting member 7 is clamped after both the end portions of the second strand material 2 are inserted into the recess portions, respectively, the gaps function as the space relieving the deformed material. As a result, since the deformation of the external surface of the connecting member 7 can be suppressed, the annular metal cord C1 having the uniform surface state can be obtained in a more ensured fashion.

In addition, in the connecting member 7, the partition wall 7b is provided between the recess portion 8 and the recess portion 8. By providing the partition wall 7b between the recess portion 8 and the recess portion 8, that is, in the central portion of the connecting member 7, the connecting member 7 can be made difficult to be bent and cracked.

Additionally, the material of the first metal filament is the alloy steel which contains C: 0.08 to 0.27 mass percent, Si: 0.30 to 2.00 mass percent, Mn: 0.50 to 2.00 mass percent, and Cr: 0.20 to 2.00 mass percent; at least any one of Mo: 0.01 to 1.00 mass percent; Ni: 0.10 to 2.00 mass percent; Co: 0.10 to 2.00 mass percent, and W: 0.01 to 1.00 mass percent, at least any one of Al, Nb, Ti and V which are each in the range of 0.001 to 0.10 mass percent, and Fe and impurities which are inevitably mixed thereinto to fill the remaining portion. By being configured like this, the first strand material 1 can be made to have the good weldability and the superior heat resistance.

In addition, the diameter of the first metal filament 5 is 0.06 to 0.40 mm, and the diameter of the second metal filament 6 is 0.06 to 0.30 mm. In this case, the first strand material 1 and the second strand material 2 can be made to have the appropriate rigidities, and the first strand material 1 and the second strand material 2 can be made to have the good fatigue resistance. Note that the more preferable diameter of the second metal filament 6 is 0.06 to 0.22 mm.

Additionally, since the first strand material 1, which makes up the annular core portion 3, is situated in the center of the cross section of the annular metal cord C1, stress is reduced when compared with the second strand material 1 in such a state that the annular metal cord C1 is bent. Because of this, by increasing the diameter of the first metal filament 5 to be thicker than the second metal filament 6 within the range of 0.06 to 0.40 mm, the rigidity of the annular metal cord C1 can be increased.

In addition, when the first strand material 1 and the second strand material 2 have the same diameter, the second strand material can be wound around the outer circumferential surface of the annular core portion 3 substantially without any gap.

Additionally, when the diameter of the first strand material 1 is larger than the diameter of the second strand material 2, the interference of the portions of the second strand material 2 on the outer layer portion 4 and uneven contact of the second strand material 2 with the annular core portion 3 can be prevented.

In addition, while the first strand material 1 and the second material 2 are made up, respectively, of the first metal filaments 5 and the second metal filaments 6 which are both twisted in the S twist fashion, the winding of the second strand material 2 around the annular core portion 3 adopts the Z twist. As this occurs, the annular metal cord C1 can be obtained which is difficult to be twisted and in which the unwinding of the second strand material 2 relative to the annular core portion 3 is made difficult so as to prevent the occurrence of loosening therein.

Additionally, the winding angle of the second strand material relative to the center axis of the annular core portion 3 is 4.5 to 13.8 degrees. In this case, the winding work of the second strand material is facilitated. In addition, the annular metal cord C1 can be obtained which has the appropriate ductility and in which the unwinding of the second strand material 2 which leads to loosening therein is prevented.

In addition, the second strand material 2 is wound around the outer circumferential surface of the annular core portion 3 six rounds. By being configured like this, since the outer layer portion 4 eventually covers the annular core portion 3 densely, the annular metal cord C1 can be stabilized geometrically. As a result, the annular metal cord C1 can be obtained in an ensured fashion which has the superior breaking strength and heat resistance and which is made difficult to be deformed in the radial direction.

In addition, the low temperature annealing treatment is applied to the annular core portion 3 and the outer layer portion 4. In this case, the internal strain in the first metal filaments 5 and the second metal filaments 6 can be removed.

Next, an endless metal belt including the annular metal cord C1 configured as has been described heretofore will be described. FIG. 10 is a diagram showing a state in which an endless metal belt according to the embodiment is in use. FIG. 11 is a partially perspective view showing the endless metal belt according to the embodiment. FIG. 12 is a side view of an element included in the endless metal belt according to the embodiment.

An endless metal belt B1 is used, for example, in a continuously variable transmission 10, as shown in FIG. 10, which is used in automobiles or other industrial machines. The endless metal belt B1 is responsible for power transmission between a V-shaped, groove variable drive-side pulley 12 and driven-side pulley 14. By winding the endless metal belt B1 around the drive-side pulley 12 and the driven-side pulley 14 in such a manner as to extend therebetween, the rotational force of the drive-side pulley 12 is transmitted to the driven-side pulley 14 via the endless metal belt B1. As is shown in FIG. 11, the endless metal belt B1 includes such annular metal cords C1 as the annular metal cord C1 that has been described above and a large number of elements E1 in each of which four of such annular metal cords C1 are inserted to be held therein from each side.

The element E1 is such as to be molded by being stamped from a sheet metal. As is shown in FIG. 12, the element E1 includes a substantially trapezoidal element main body portion 20, a neck portion 24 lying between a pair of left and right accommodating portions 22, 22 in which the annular metal cords C1 are fitted and an ear portion 26 exhibiting a substantially triangular shape which is connected to an upper portion of the element main body portion 20 via the neck portion 24. A pair of pulley abutment surfaces 28, which can be brought into abutment with the drive-side pulley 12 and the driven-side pulley 14 are formed, respectively, at left and right outer end portions of the element main body portion 20. In addition, a raised portion 38 and a recessed portion (not shown) which each have a circular cross section and which are adapted to loosely fit in and on their mating portions are formed on a front and rear surface of the ear portion 26 so as to connect the longitudinally adjacent elements E1 together.

Saddle surfaces 32, 32 and ear portion lower surfaces 36, 36 are formed, respectively, on lower edges and upper edges of the accommodating portions 22, 22. Four arc-shaped accommodating recess portions 34 are provided on each of the saddle surfaces 32, 32. Lower surfaces of the four annular metal cords C1 are brought into abutment with the four accommodating recess portions 34, respectively. A slight gap is defined between upper surfaces of the annular metal cords C1 and the ear portion lower surfaces 36, 36.

As has been described before, the annular metal cord C1 has the very large breaking strength. In addition, since the annular metal cord C1 has a substantially circular cross section, the annular metal cord C1 has strong resistance to twist when compared with one having a rectangular cross section. Consequently, the endless metal belt B1 in which the annular metal cords C1 are inserted to be held in the elements E1 which each have the configuration that has been described above has eventually very superior flexing resistance and durability.

Note that the invention is not limited to the embodiment that has been described heretofore but can be modified variously.

For example, in the annular metal cord C1 of the embodiment, the second strand material is wound around the outer circumferential surface of the annular core portion 3 six rounds. This may be modified such that in the event that the diameters of the first strand material 1 and the second strand material 2 are different, the second strand material 2 may be wound around the annular core portion 3 seven or eight rounds.

In addition, in the annular metal cord C1 of the embodiment, as is shown in FIG. 4(*a*), a layer of the second strand material 2 covers the outer circumferential surface of the annular core portion 3. This may be modified such that the outer circumferential surface of the annular core portion 3 is covered by a plurality of layers of the second strand material 2. For example, in the event that the outer circumferential surface of the annular core portion 3 is covered by two layers of the second strand material 2, a first layer is formed by winding the second strand material 2 around the outer circumference of the annular core portion 3 six rounds, and thereafter, a second layer is formed by winding the second strand material 2 around an outer circumferential surface of the first layer twelve rounds.

In addition, while in the annular metal code C1 of the embodiment, the first strand material 1 and the second strand material 2 are formed using the S twist and the second strand material 2 is wound around the outer circumferential surface of the annular core portion 3 using the Z twist, the first strand material 1 and the second strand material 2 are formed using the Z twist and the second strand material 2 is wound around the outer circumferential surface of the annular core portion 3 using the S twist.

In addition, while the annular metal cord C1 of the embodiment is formed to have the substantially circular cross section, as is shown in FIG. 4(a), a flat cross section may be adopted. As this occurs, the annular metal cord C1 having the substantially circular cross-section is pressed so as to be deformed. By pressing the annular metal cord C1 to form it into the flat shape in this way, a contact area between the endless metal belt B1 which includes the annular metal cord C1 configured as described above and the elements E1 can be increased. As a result, the power transmission between the drive-side pulley 12 and the driven-side pulley 14 can be implemented with good efficiency. In addition, the flatness is preferably equal to or more than 66%.

In addition, in the endless metal belt B1 of the embodiment, while the four annular metal cords C1 are inserted to be held on each side of the element E1, the number of the annular metal cords C1 which are so inserted to be held is not limited thereto. The number of the annular metal cords C1 can be adjusted according to required flexing resistance and durability.

In addition, while in the embodiment, the annular metal cord is described as being applied to the endless metal belt for transmitting power in the continuously variable transmission, the annular metal cord of the invention can also be applied to endless metal belts which are used in machines other than continuously variable transmissions. For example, the annular metal cord of the invention can be applied to an endless metal belt which is responsible for power transmission between sheet feeding rollers in printing machines including printers, an endless metal belt which is responsible for direct drive for a uniaxial robot, an endless metal belt which is responsible for driving an X-Y table mechanism or three-dimensional carriage, an endless metal belt which is responsible for precision drive in optical equipment, inspecting machinery or measuring equipment.

In addition, the materials of the first metal filament 5 and the second metal filament 6 are not limited to those described above.

In addition, in the endless metal belt B1 of the embodiment, the form of the element used is not limited to that shown in FIGS. 11 and 12.

For example, elements of various forms as are shown in FIGS. 13 to 17 can be used. Similar to the element E1, elements E2 to E6, which will be illustrated below, are also molded by being stamped from a sheet metal.

An element E2 shown in FIG. 13 includes a substantially trapezoidal element main body portion 20a, a neck portion 24a which lies between a pair of left and right accommodating portions 22a, 22a in which the annular metal cords C1 are fitted and an ear portion 26a exhibiting a substantially triangular shape which is connected to an upper portion of the element main body portion 20a via the neck portion 24a. Since the neck portions 24a has no curved recess portion in corner portions thereof when compared with the neck portion 24 of the element E1, the strength thereof is increased. Namely, the service life of the endless metal belt 1 which utilizes the elements E2 is increased.

A pair of pulley abutment surfaces 28a, 28a which can be brought into abutment with the drive-side pulley 12 and the driven-side pulley are formed, respectively, at left and right outer end portions of the element main body portion 20a. In addition, a raised portion 38a and a recessed portion (not shown) which each have a circular cross section and which are adapted to loosely fit in and on their mating portions are formed on a front and rear surface of the ear portion 26a so as to connect the longitudinally adjacent elements E2 together. Ear portion lower surfaces 36a, 36a and saddle surfaces 32a, 32a are formed, respectively, on upper edges and lower edges of the accommodating portions 22a, 22a. An accommodating recess portion (an accommodating groove) 34 for accommodating three annular metal cords C1 is formed on each of the saddle surfaces 32a, 32a. Lower surfaces of the three annular metal cords C1 are brought into abutment with each of the accommodating recess portions 34a so that the annular metal cords C1 are partially accommodated therein to thereby suppress the dislocation of the annular metal cords C1 therefrom. A slight gap is defined between upper surfaces of the annular metal cords C1 and the ear portion lower surfaces 36a, 36a.

An element E3 shown in FIG. 14 includes a substantially trapezoidal element main body portion 20b, a neck portion 24b which lies between a pair of left and right accommodating portions 22b, 22b in which the annular metal cords C1 are fitted and an ear portion 26b exhibiting a substantially triangular shape which is connected to an upper portion of the element main body portion 20b via the neck portion 24b. Since the neck portions 24b has no curved recess portion in corner portions thereof when compared with the neck portion 24 of the element E1, the strength thereof is increased. Namely, the service life of the endless metal belt 1 which utilizes the elements E3 is increased.

A pair of pulley abutment surfaces 28b, 28b which can be brought into abutment with the drive-side pulley 12 and the driven-side pulley 14 are formed, respectively, at left and right outer end portions of the element main body portion 20b. In addition, a raised portion 38b and a recessed portion (not shown) which each have a circular cross section and which are adapted to loosely fit in and on their mating portions are formed on a front and rear surface of the ear portion 26b so as to connect the longitudinally adjacent elements E3 together. Ear portion lower surfaces 36b, 36b and saddle surfaces 32b, 32b are formed, respectively, on upper edges and lower edges of the accommodating portions 22b, 22b. The saddle surfaces 32b, 32b are each formed as a curved recess portion (an accommodating groove) for accommodating three annular metal cords C1. Lower surfaces of the three annular metal cords C1 are brought into abutment with each saddle surface 32b so that the annular metal cords C1 are partially accommodated therein to thereby suppress the dislocation of the annular metal cords C1 therefrom. A slight gap is defined between upper surfaces of the annular metal cords C1 and the ear portion lower surfaces 36b, 36b.

An element E4 shown in FIG. 15 includes a substantially trapezoidal first element main body portion 20c, a neck portion 24c which lies between a pair of left and right accommodating portions 22c, 22c in which the annular metal cords C1 are fitted and a substantially trapezoidal second element main body portion 26c which is connected to an upper portion of the element main body portion 20c via the neck portion 24c. Since the neck portions 24c has no curved recess portion in corner portions thereof when compared with the neck portion 24 of the element E1, the strength thereof is increased. Namely, the service life of the endless metal belt 1 which utilizes the elements E4 is increased.

A pair of pulley abutment surfaces 28c, 28c which can be brought into abutment with the drive-side pulley 12 and the driven-side pulley 14, respectively, are formed, respectively, at left and right outer end portions of the first element main body portion 20c and the second element main body portion 26c. In addition, a raised portion 38c and a recessed portion (not shown) which each have a circular cross section and which are adapted to loosely fit in and on their mating portions are formed on a front and rear surface of the second element main body portion 26c so as to connect the longitudinally adjacent elements E4 together. Accommodating portion upper surfaces 36c, 36c and saddle surfaces 32c, 32c are formed, respectively, on upper edges and lower edges of the accommodating portions 22c, 22c. The saddle surfaces 32c, 32c are each formed as a curved recess portion (an accommodating groove) for accommodating three annular metal cords C1. Lower surfaces of the three annular metal cords C1 are brought into abutment with each saddle surface 32c so that the annular metal cords C1 are partially accommodated therein to thereby suppress the dislocation of the annular metal cords C1 therefrom. A slight gap is defined between upper surfaces of the annular metal cords C1 and the ear portion lower surfaces 36c, 36c.

Since the pulley abutment surfaces 28c are provided above and blow (on an outer circumferential side and an inner circumferential side of) the annular metal cords C1 which are accommodated in the accommodating portions 22c, the element E4 is made easy to secure a contact area with the pulleys. Because of this, an increase in torque transmission amount of the endless metal belt B1 which utilizes the elements H4 is realized. In addition, not only can a reduction in weight of the element E4 and hence of the endless metal belt B1 which utilizes the elements E4 be realized by decreasing the height (a vertical length as viewed in FIG. 15) of the element E4 but also the ratio coverage (a ratio in magnitude of diameter between the drive-side pulley 12 and the driven-side pulley 14) of the endless metal belt B1 can be expanded.

An element E5 shown in FIG. 16 includes a substantially trapezoidal element main body portion 20d, an accommodating portion 22d which is formed in the center of the element main body portion 20d in such a manner that the annular metal cords C1 are fitted therein and an opening 24d which is opened in a central upper portion of the element main body portion 20d in such a manner as to communicate with the accommodating portion 22d. Namely, the element main body portion 20d is formed into a shape which surrounds the annular metal cords C1 which are fitted in the accommodating portion 22d. A curved recess portion (an accommodating groove) 32d is formed on a lower edge of the accommodating portion 22d, so that lower surfaces of five annular metal cords C1 are brought into abutment with the curved recess portion 32d so as to be partially accommodated therein. Since the annular metal cords C1 within the accommodating portion 22d are surrounded by the element main body portion 20d except the upper opening 24d, the dislocation of the annular metal cords C1 is prevented. In addition, a slight gap is provided between upper surfaces of the respective annular metal cords C1 and an accommodating portion upper surface 36d.

A pair of pulley abutment surfaces 28d, 28d which can be brought into abutment with the drive-side pulley 12 and the driven-side pulley 14, respectively, are formed, respectively, at left and right outer end portions of the element main body portion 20d. In addition, a raised portion 38d and a recessed portion (not shown) which each have a circular cross section and which are adapted to loosely fit in and on their mating portions are formed on a front and rear surface of the element main body portion 20d at a central lower portion thereof so as to connect the longitudinally adjacent elements E5 together.

Since the pulley abutment surfaces 28d are provided above and blow (on an outer circumferential side and an inner circumferential side of) the annular metal cords C1 which are accommodated in the accommodating portion 22d, the element E5 is made easy to secure a contact area with the pulleys. Because of this, an increase in torque transmission amount of the endless metal belt B1 which utilizes the elements H5 is realized. In addition, not only can a reduction in weight of the element E5 and hence of the endless metal belt B1 which utilizes the elements E5 be realized by decreasing the height (a vertical length as viewed in FIG. 16) of the element E5 but also the ratio coverage (a ratio in magnitude of diameter between the drive-side pulley 12 and the driven-side pulley 14) of the endless metal belt B1 can be expanded.

An element E6 shown in FIG. 17 includes a substantially trapezoidal element main body portion 20e, an accommodating portion 22e which is formed in the center of the element main body portion 20e in such a manner that the annular metal cords C1 are fitted therein and an opening 24e which is opened in a right-hand side of the element main body portion 20e in such a manner as to communicate with the accommodating portion 22e. Namely, the element main body portion 20e is formed into a shape which surrounds the annular metal cords C1 which are fitted in the accommodating portion 22e. A curved recess portion (an accommodating groove) 32e is formed on a lower edge of the accommodating portion 22e, so that lower surfaces of five annular metal cords C1 are brought into abutment with the curved recess portion 32e so as to be partially accommodated therein. Since the annular metal cords C1 within the accommodating portion 22e are surrounded by the element main body portion 20e except the right-hand side opening 24e, the dislocation of the annular metal cords C1 is prevented. In addition, a slight gap is provided between upper surfaces of the respective annular metal cords C1 and an accommodating portion upper surface 36e.

A pair of pulley abutment surfaces 28e, 28e which can be brought into abutment with the drive-side pulley 12 and the driven-side pulley 14, respectively, are formed, respectively, at left and right outer end portions of the element main body portion 20e. In addition, a raised portion 38e and a recessed portion (not shown) which each have a circular cross section and which are adapted to loosely fit in and on their mating portions are formed on a front and rear surface of the element main body portion 20e at a central upper portion thereof so as to connect the longitudinally adjacent elements E6 together.

Since the pulley abutment surfaces 28e are provided above and blow (on an outer circumferential side and an inner circumferential side of) the annular metal cords C1 which are accommodated in the accommodating portion 22e, the element E6 is made easy to secure a contact area with the pulleys. Because of this, an increase in torque transmission amount of the endless metal belt B1 which utilizes the elements H6 is realized. In addition, not only can a reduction in weight of the element E6 and hence of the endless metal belt B1 which utilizes the elements E6 be realized by decreasing the height (a vertical length as viewed in FIG. 17) of the element E6 but also the ratio coverage (a ratio in magnitude of diameter between the drive-side pulley 12 and the driven-side pulley 14) of the endless metal belt B1 can be expanded.

In addition, this element E6 is preferably used in combination with an element in which an opening is formed on an opposite side to the side in FIG. 17 where the opening 24e is formed. For example, in the event that elements E6 which have the openings 24e which are oriented differently are combined every single or plurality of elements, a lateral balance relative to the pulleys can be made even, whereby a change in contact force resulting when the elements bite into the pulleys can be decreased, thereby making it possible to reduce noise. In addition, wear can also be suppressed.

In addition, in the respective elements E1 to E6, a pitch is located in a chain-line position indicated by reference character CL in FIGS. 12 to 17, and in the elements E4 to E6, the pitch is located in a position which matches the rotational running surface of the annular metal cords C1. Consequently, in the elements E4 to E6, the elements E4 to E6 slip in no case relative to the running annular metal cords C1 when they bite into the pulleys, thereby making it possible to provide good transmission efficiency.

Note that the number of annular metal cords C1 which are used together with the elements E1 to E6 is not limited to those described in the examples described heretofore but can be modified appropriately.

While the invention has been described in detail and by reference to the specific embodiments, it is obvious to those skilled in the art that the invention can be changed or modified variously without departing from the spirit and scope of the invention. The subject patent application is based on the Japanese Patent Application (No. 2005-326286) filed on Nov. 10, 2005 and the Japanese Patent Application (No. 2006-302616) filed on Nov. 8, 2006, and the contents thereof are incorporated herein by reference.

The invention claimed is:

1. An annular metal cord comprising:
an annular core portion formed by connecting together ends of a first strand material which is made up of a plurality of first twisted metal filaments; and
an outer layer portion formed by winding a second strand material made up of a plurality of second twisted metal filaments around the annular core portion spirally and a plurality of rounds in such a manner as to cover an external circumferential surface of the annular core portion, wherein
the second strand material which forms the outer layer portion is wound at a predetermined winding angle relative to a center axis of the annular core portion, and a winding initiating end portion and a winding terminating end portion of the second strand material are connected together.

2. An annular metal cord as set forth in claim 1, wherein a connecting portion of the first strand material and a connecting portion of the second strand material are located in different positions in a circumferential direction of the annular core portion.

3. An annular metal cord as set forth in claim 1, wherein a material of the first metal filament is an alloy steel which contains C: 0.08 to 0.27 mass percent, Si: 0.30 to 2.00 mass percent, Mn: 0.50 to 2.00 mass percent, and Cr: 0.20 to 2.00 mass percent; at least any one of Mo: 0.01 to 1.00 mass percent; Ni: 0.10 to 2.00 mass percent; Co: 0.10 to 2.00 mass percent, and W: 0.01 to 1.00 mass percent, at least any one of Al, Nb, Ti and V which are each in the range of 0.001 to 0.10 mass percent, and Fe and impurities which are inevitably mixed thereinto to fill the remaining portion.

4. An annular metal cord as set forth in claim 1, wherein a diameter of the first metal filament is 0.06 to 0.40 mm.

5. An annular metal cord as set forth in claim 1, wherein a diameter of the second metal filament is 0.06 to 0.30 mm.

6. An annular metal cord as set forth in claim 1, wherein the first strand material and the second strand material have the same diameter, or the diameter of the first strand material is larger than the diameter of the second strand material.

7. An annular metal cord as set forth in claim 1, wherein a twist direction of the first metal filaments in the first strand material and a twist direction of the second metal filaments of the second strand material are the same, and the twist direction of the first metal filaments in the first strand material and the second metal filaments of the second strand material and a winding direction of the second strand material are opposite.

8. An annular metal cord as set forth in claim 1, wherein a winding angle of the second strand material relative to a center axis of the annular core portion is 4.5 to 13.8 degrees.

9. An annular metal cord as set forth in claim 1, wherein the second strand material is wound around the outer circumferential surface of the annular core portion six to eight rounds.

10. An annular metal cord as set forth in claim 1, wherein a low temperature annealing treatment is given to the annular core portion and the outer layer portion.

11. An endless metal belt characterized by comprising an annular metal cord as set forth in claim 1.

12. An endless metal belt as set forth in claim 11, wherein a plurality of elements which are assembled together in a circumferential direction of the annular metal cord are brought into abutment with the annular metal cord and each have an accommodating groove which accommodates therein part of the annular metal cord.

13. An endless metal belt as set forth in claim 11, wherein the plurality of elements which are assembled together in the circumferential direction of the annular metal cord each comprise a pulley abutment surface which can be brought into abutment with a pulley on an outer circumferential side and an inner circumferential side of the annular metal cord.

14. An endless metal belt as set forth in claim 1, wherein a pitch position of the plurality of elements which are assembled together in the circumferential direction of the annular metal cord is a position which substantially coincides with a rotationally running surface of the annular metal cord.

* * * * *